US011593037B2

(12) United States Patent
Kaushik

(10) Patent No.: US 11,593,037 B2
(45) Date of Patent: Feb. 28, 2023

(54) FILE SYSTEM BLOCK-LEVEL TIERING AND CO-ALLOCATION

(71) Applicant: International Business Machines Corporation, Armonk, NY (US)

(72) Inventor: Rini Kaushik, Sunnyvale, CA (US)

(73) Assignee: International Business Machines Corporation, Armonk, NY (US)

( * ) Notice: Subject to any disclaimer, the term of this patent is extended or adjusted under 35 U.S.C. 154(b) by 676 days.

(21) Appl. No.: 16/698,373

(22) Filed: Nov. 27, 2019

(65) Prior Publication Data

US 2020/0097218 A1    Mar. 26, 2020

Related U.S. Application Data

(63) Continuation of application No. 15/904,190, filed on Feb. 23, 2018, now Pat. No. 10,558,399, which is a continuation of application No. 14/669,565, filed on Mar. 26, 2015, now Pat. No. 9,952,808.

(51) Int. Cl.
*G06F 3/06* (2006.01)

(52) U.S. Cl.
CPC ............ *G06F 3/0685* (2013.01); *G06F 3/061* (2013.01); *G06F 3/067* (2013.01); *G06F 3/0643* (2013.01); *G06F 3/0647* (2013.01)

(58) Field of Classification Search
CPC ...... G06F 3/0685; G06F 3/061; G06F 3/0643; G06F 3/0647; G06F 3/067; G06F 12/00; G06F 13/00
See application file for complete search history.

(56) References Cited

U.S. PATENT DOCUMENTS

| 5,848,406 A | 12/1998 | Mani |
|---|---|---|
| 5,918,225 A | 6/1999 | White |
| 6,330,555 B1 | 12/2001 | Weber |
| 6,425,020 B1 | 7/2002 | Sharma et al. |

(Continued)

FOREIGN PATENT DOCUMENTS

| CN | 101213510 A | 7/2008 |
|---|---|---|
| CN | 103440244 A | 12/2013 |

(Continued)

OTHER PUBLICATIONS

Anonymous, "Method and System for Reducing Storage Consumption using Virtual Storage Blocks and Block-Level Virtualization and Deduplication", Mar. 22, 2010, IP.com, pp. 1-4, United States.

(Continued)

*Primary Examiner* — Tuan V Thai
(74) *Attorney, Agent, or Firm* — Sherman IP LLP; Kenneth L. Sherman; Steven Laut

(57) ABSTRACT

A method includes receiving a workload in a multi-tier enterprise storage system. The workload including a database. A processor determines if historical query logs present for the workload. Upon a determination that historical query logs are present for the workload: the processor analyzes a query log of historical queries for the database; an inter- and intra-query weighted column relationship graph is created based on the analyzing; and weights are assigned to the weighted column relationship graph based on an optimization process that maximizes performance for the historical queries in a training window.

17 Claims, 11 Drawing Sheets

(56) References Cited

U.S. PATENT DOCUMENTS

| | | | |
|---|---|---|---|
| 6,487,641 | B1 | 11/2002 | Cusson |
| 7,024,414 | B2 | 4/2006 | Sah et al. |
| 7,499,907 | B2 | 3/2009 | Brown et al. |
| 7,756,873 | B2 | 7/2010 | Gould et al. |
| 7,761,444 | B2 | 7/2010 | Zhang et al. |
| 8,121,975 | B2 | 2/2012 | Averbuch et al. |
| 8,150,850 | B2 | 4/2012 | Herrnstadt |
| 8,284,627 | B2 | 10/2012 | Belluomini et al. |
| 8,478,775 | B2 | 7/2013 | Netz et al. |
| 8,538,969 | B2 | 9/2013 | Bailey |
| 8,756,382 | B1 | 6/2014 | Carlson et al. |
| 8,868,576 | B1 | 10/2014 | Faibish |
| 8,935,223 | B2 | 1/2015 | Ganesh et al. |
| 9,298,854 | B2 | 3/2016 | Ikawa |
| 2004/0181533 | A1 | 9/2004 | Santosuosso |
| 2007/0002612 | A1 | 1/2007 | Chang et al. |
| 2009/0043984 | A1 | 2/2009 | Chang et al. |
| 2009/0210445 | A1 | 8/2009 | Draese |
| 2011/0029376 | A1 | 2/2011 | Mills |
| 2011/0295792 | A1 | 12/2011 | Mascarenhas et al. |
| 2012/0102350 | A1 | 4/2012 | Belluomini et al. |
| 2012/0198152 | A1 | 8/2012 | Terry et al. |
| 2013/0091098 | A1 | 4/2013 | Hung |
| 2013/0159285 | A1 | 6/2013 | Dees et al. |
| 2013/0275653 | A1 | 10/2013 | Ranade |
| 2013/0312005 | A1 | 11/2013 | Chiu et al. |
| 2015/0039585 | A1 | 2/2015 | Fabijancic |
| 2015/0058352 | A1 | 2/2015 | Brand |
| 2015/0074069 | A1* | 3/2015 | Baeuerle .............. G06F 8/35 707/702 |
| 2015/0106578 | A1 | 4/2015 | Warfield |
| 2015/0186434 | A1 | 7/2015 | Eichinger |
| 2016/0012107 | A1* | 1/2016 | Asaad .............. G06F 16/24569 707/764 |
| 2020/0151191 | A1* | 5/2020 | Agrawal .............. G06F 16/2457 |
| 2020/0401798 | A1* | 12/2020 | Foncubierta Rodriguez .............. G06T 7/70 |

FOREIGN PATENT DOCUMENTS

| | | |
|---|---|---|
| EP | 2159681 A2 | 3/2010 |
| EP | 2270643 A1 | 1/2011 |
| JP | 2008545202 A | 12/2008 |
| JP | 2012128718 A | 7/2012 |
| JP | 4988215 B2 | 8/2012 |
| JP | 2013012212 A | 1/2013 |
| JP | 5266250 B2 | 8/2013 |
| KR | 1020080025178 A | 3/2008 |
| KR | 1020120030079 A | 3/2012 |
| WO | 2007002866 A2 | 1/2007 |
| WO | 2015193771 A1 | 12/2015 |

OTHER PUBLICATIONS

IBM, "A method for efficient recovery of file-level information from block level images, which is operating-system agnostic", Nov. 12, 2009, IP.com, pp. 1-4, United States.

Lee, D. et al., "Benchmarking and Modeling Disk-based Storage Tiers for Practical Storage Design", ACM Performance Evaluation Review, Sep. 2012, pp. 113-118, vol. 40, No. 2, ACM, United States.

Kawabata et al., "InfoFrame DataBooster for High-Speed Processing of Big Data," NEG Technical Journal, 2012, pp. 28-32, v.7, n.2, United States.

Guoliang Zhou et al., "Cache Conscious Star-Join in MapReduce Environments," Proceedings of the 2nd International Workshop on Cloud Intelligence, Aug. 26, 2013, pp. 1-7, ACM, United States.

Abadi, D., et al., "Column-Stores vs. Row-Stores: How Different Are They Really?" SIGMOD'08, Jun. 9-12, 2008, pp. 1-14, Vancouver, BC, Canada.

Agarwal, S., et al., "BlinkDB: Queries with Bounded Errors and Bounded Response Times on Very Large Data," Eurosys'13 Apr. 15-17, 2013, pp. 29-42, Prague, Czech Republic.

Ailamaki, A., et al., "Weaving Relations for Cache Performance," Proceeding of the 27th VLDB Conference, 2001, pp. 1-12, Roma, Italy.

Google Cloud Platform, "BigQuery," Internet retrieval https://cloud.google.com/products/bigquery; retrieval date Jun. 12, 2014; pp. 1-7, United States.

IBM, "What's the big deal about Big SQL?," http://www.ibm.com/developersworks/library/bd-bigsql/; dated Jun. 14, 2013; pp. 1-9, United States.

He, Y., et al., "RCFile: A Fast and Space-Efficient Data Placement Structure in MapReduce-based Warehouse Systems," IEEE ICDE Conference 2011, pp. 1199-1208, United States.

Lee, S., et al., "Design of Flash-Based DBMS: An In-Page Logging Approach," SIGMOD '07, Jun. 12-14, 2007, pp. 55-66, Beijing, China.

Li, Y., et al., "Tree indexing on Solid State Drives," Proceedings of the VLDB Endowment, Copyright 2010, pp. 1-12, vol. 3, No. 1, United States.

Melnik, S., et al., "Dremel: Interactive Analysis of Web-Scale Datasets," Proceedings of the VLDB Endowment, Copyright 2010, pp. 1-10, vol. 3, No. 1, United States.

Ross, K., et al., "Modeling the Performance of Algorithms on Flash Memory Devices," Proceedings of the Fourth International Workshop on Data Management on New Hardware (DaMoN 2008), Jun. 13, 2008, pp. 11-16, Vancouver, Canada.

Shute, J., et al., "F1: A Distributed SQL Database That Scales," Proceeding of the VLDB Endowment, Aug. 26-30, 2103, pp. 1-12, United States.

M. McCarthy, et al., "Efficient Updates for OLAP Range Queries on Flash Memory," Advance Access Publication on Feb. 2, 2011; The Computer Journal, vol. 54; No. 11, 2011; pp. 1776-1789.

Yin et al., "A Sequential Indexing Scheme for Flash-Based Embedded Systems", EDBT'09, Mar. 24-26, 2009, Saint Petersburg, Russia, 12 pages, Copyright 2009 ACM.

Tsirogiannis et al., "Query Processing Techniques for Solid State Drives", SIGMOD'09, Jun. 29-Jul. 2, 2009, Providence, Rhode Island, 13 pages, Copyright 2009 ACM.

Baumann et al., "Flashing Databases: Expectations and Limitations", Proceedings of the Sixth International Workshop on Data Management on New Hardware (DaMoN 2010), Jun. 7, 2010, Indianapolis, Indiana, 10 pages, Copyright 2010 ACM.

Lee et al., "A Case for Flash Memory SSD in Enterprise Database Applications", SIGMOD'08, Jun. 9-12, 2008, Vancouver, BC, Canada, 12 pages, Copyright 2008 ACM.

Nath et al., "FlashDB: Dynamic Self-tuning Database for NAND Flash", IPSN'07, Apr. 25-27, 2007, Cambridge, Massachusetts, 10 pages, Copyright 2007 ACM.

Pelley et al., "Do Query Optimizers Need to be SSDaware?", The Second International Workshop on Accelerating Data Management Systems using Modern Processor and Storage Architectures (ADMS'11), 8 pages, Copyright 2011.

International Search Report and the Written Opinion of the International Searching Authority, International Application No. PCT/IB2015/054387, dated Sep. 29, 2015, 5 pages.

Kaushik, R., "Flash RCFile: Flash-Optimized File Format for Interactive SQL on Hadoop", HotStorage '14, 6th USENIX Workshop on Hot Topics in Storage and File Systems, Jun. 17, 2014, Philadelphia, PA, 6 pages.

Application No. GB1621179.9, Patents Act 1977: Examination Report under Section 18(3), dated Mar. 30, 2017, 2 pages.

Rockwood, J. et al., "Optimizing analytic workloads using DB2 10.5 with BLU Acceleration", IBM DB2 for Linux, UNIX, and Windows, Updated: May 2014, p. 1-27.

Chinese Office Action dated Jan. 8, 2019 for Chinese Patent Application No. 201610177924.8 from Chinese Patent Office, pp. 1-11, Beijing, China.

Japanese Office Action dated Mar. 19, 2019 for Japanese Patent Application No. 2016571407 from Japanese Patent Office, pp. 1-2, Tokyo, Japan.

List of IBM Patents or Patent Applications Treated as Related: Kaushik, R., U.S. Appl. No. 15/904,190, filed Mar. 26, 2015; Kaushik, R., U.S. Appl. No. 14/669,565, filed Feb. 23, 2018; Kaushik, R., U.S. Appl. No. 14/305,179, filed Jun. 16, 2014;

(56) References Cited

OTHER PUBLICATIONS

Kaushik, R., U.S. Appl. No. 15/693,513, filed Sep. 1, 2017. List of IBM Patents or Patent Applications Treated as Related: Kaushik, R., U.S. Appl. No. 15/943,748, filed Apr. 3, 2018; Kaushik, R., U.S. Appl. No. 14/305,061, filed Jun. 16, 2014.

\* cited by examiner

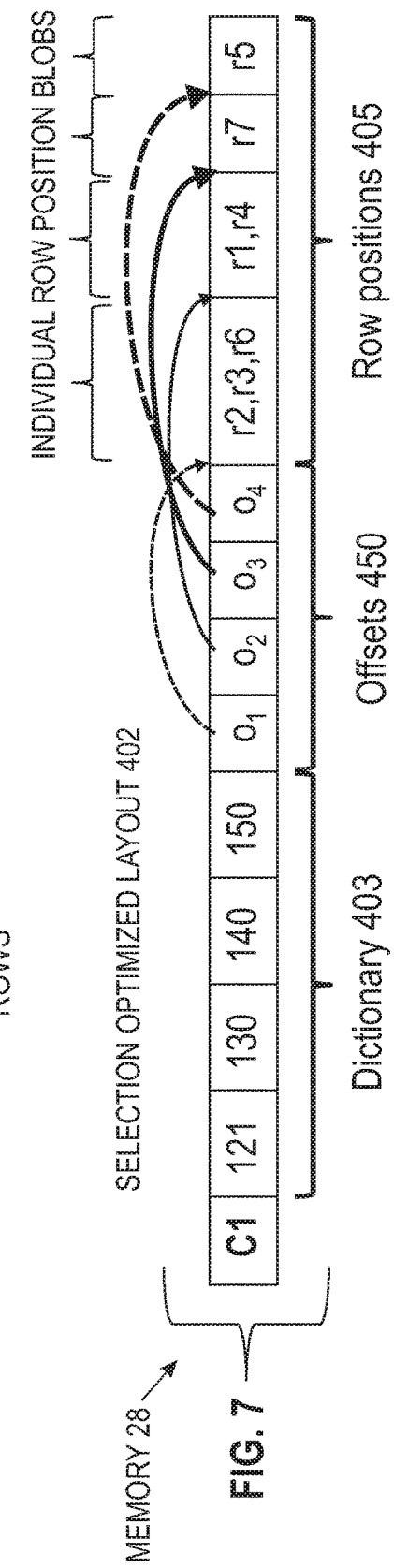

FILE SYSTEM BLOCK-LEVEL TIERING AND CO-ALLOCATION

BACKGROUND

The term "Big Data" is used as a blanket term for any collection of datasets so large and complex that it becomes difficult to process using on-hand database management tools or traditional data processing applications. The challenges include capture, curation, storage, search, sharing, transfer, analysis and visualization. The trend to larger data sets is due to the additional information derivable from analysis of a single large set of related data, as compared to separate smaller sets with the same total amount of data, allowing correlations to be found to spot business trends, determine quality of research, prevent diseases, link legal citations, combat crime, and determine real-time roadway traffic conditions.

Big data is difficult to work with using most relational database management systems and desktop statistics and visualization packages, requiring instead massively parallel software running on tens, hundreds, or even thousands of servers. What is considered "Big data" varies depending on the capabilities of the organization managing the set, and on the capabilities of the applications that are traditionally used to process and analyze the data set in its domain. Big Data usually includes data sets with sizes beyond the ability of commonly used software tools to manage, and process the data within a tolerable elapsed time.

As used herein, a large database is a columnar or hybrid columnar database which stores data tables as sections of columns of data rather than as rows of data and that includes at least one petabyte of data. Such large databases are currently used for a variety of applications in which very large amounts of data is stored, queried, aggregated, analyzed and searched such as business data analytics applications. Modern business data analytics applications compute aggregates over a large amount of data to roll-up information along an increasing number of dimensions such as geographic regions, demography, users, products, etc. Traditionally, online business analytics databases executed such queries by performing sequential scans over a significant portion of the database. As a result of the increasing sizes and dimensions, and increasing importance of interactive query response times of today's large analytics databases, querying the database by scanning the entire large database is not feasible. In addition to the size of large databases other factors make low latency querying of large databases with known techniques difficult. For example, in online analytics databases the percentage of database queries that are ad hoc in nature is high, which makes the creation of an index for the large database difficult. The large number of dimensions render techniques such as pre-computed cubes very space and computationally exorbitant.

Currently, these large analytics databases are stored on traditional data storage devices such as hard disk drives and the like. Recently, in an attempt to improve the performance of the large columnar databases, some large databases have been stored on high performance storage devices such as solid state devices or flash memory and the like. While storing large databases on high performance storage devices increases the speed of some queries on the large databases, the increased performance comes at a high cost as high performance storage devices are much more expensive than traditional data storage devices.

SUMMARY

Embodiments relate to guiding columnar data placement. One embodiment includes a method including receiving a workload in a multi-tier enterprise storage system. The workload including a database. A processor determines if historical query logs present for the workload. Upon a determination that historical query logs are present for the workload: the processor analyzes a query log of historical queries for the database; an inter- and intra-query weighted column relationship graph is created based on the analyzing; and weights are assigned to the weighted column relationship graph based on an optimization process that maximizes performance for the historical queries in a training window.

These and other features, aspects and advantages of the embodiments will become understood with reference to the following description, appended claims and accompanying figures.

BRIEF DESCRIPTION OF THE DRAWINGS

FIG. 6 illustrates the original relationship of columns and rows having data values in a table.

FIG. 7 illustrates a selection optimized layout for selection column.

DETAILED DESCRIPTION

Figure 1:
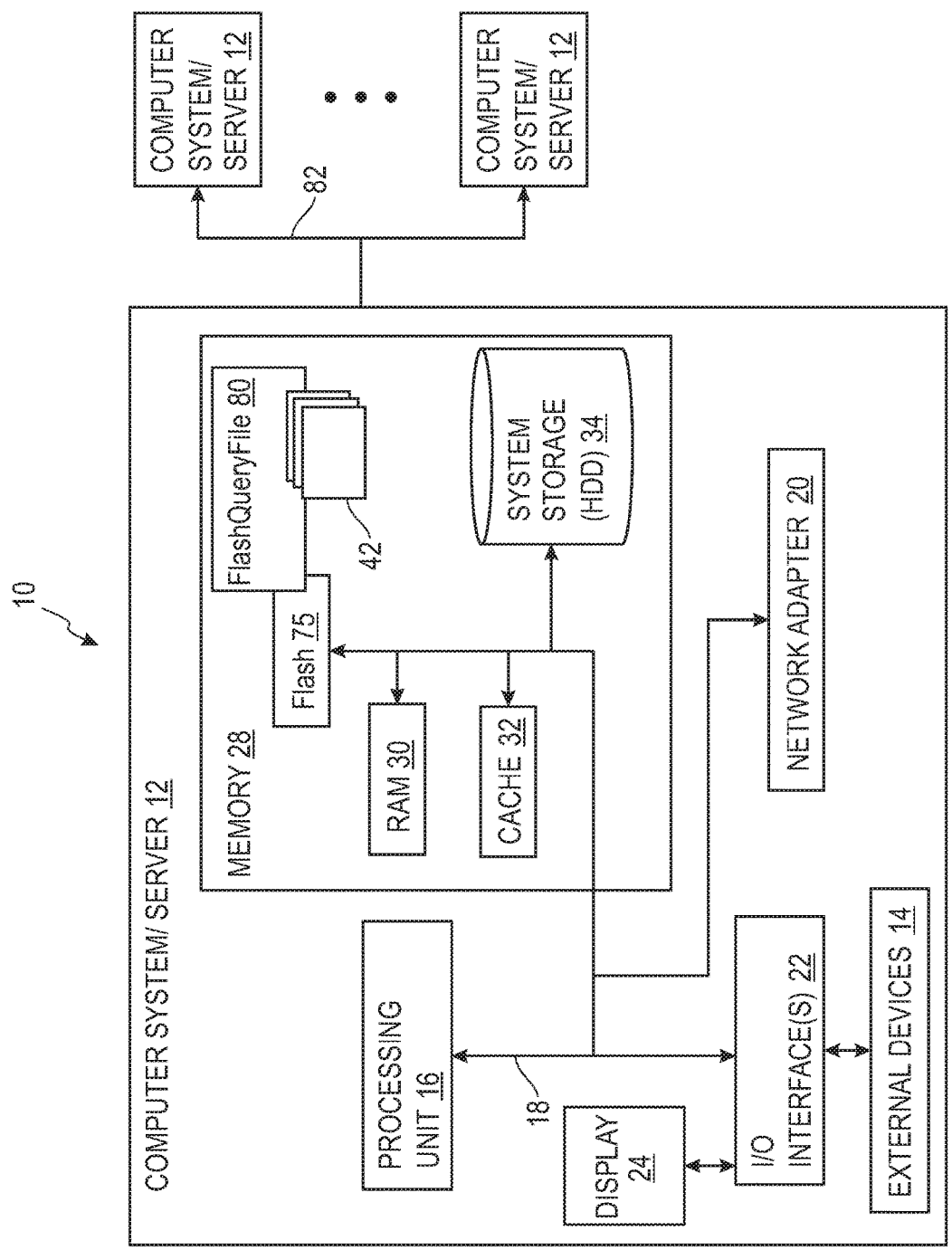
FIG. 1 illustrates a cloud computing node, according to an embodiment.

Aspects of the embodiments are described below with reference to flowchart illustrations and/or block diagrams of methods, apparatus (systems), and computer program products, according to the embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

A majority of the known database storage tiering techniques aim to place popular, frequently accessed data on the high performance, randomly accessible tier such as a "Flash tier." The data popularity is determined in a reactive manner, whereby, a module records the access patterns of the workload and if a data set starts to get accessed a lot, it is deemed popular and is moved to the high performance tier. Such reactive techniques suffer from a reaction time to determine the access patterns and are unable to provide upfront performance guarantees. Furthermore, a majority of these techniques are at much lower block-level and do not have semantic knowledge about the data at columnar level.

One embodiment provides a method including obtaining a file in a file system. The file is separated into a plurality of blocks. Each block of the plurality of blocks is separated into at least two correlated sub-blocks. Intra-file block organized storage placement on different memory devices is determined for the at least two correlated sub-blocks in a file system metadata layout. It should be noted that the file system metadata has a file system metadata structure, also referred to as a "file system metadata layout." The file system metadata structure or file system metadata layout refers to the layout or format used by a file system for storing the file system metadata. The file system metadata is associated with file system metadata layout. If the storage medium (e.g., system storage 34 (FIG. 1) is implemented with one or plural disks, the file system metadata layout is referred to as a file system disk layout. The file system metadata layout may change to support new features added to the file system, or to support different file sizes (e.g., larger). The file system metadata includes information fields that describe various characteristics of user data.

In one embodiment, the intra-file block organized storage placement is based on intra-file block tiering and co-location on different memory devices (e.g., a solid state drive (SSD) and a hard disk drive (HDD). In one embodiment, a mechanism to pass an advisory to the file system by an application to place incoming file blocks on a specific tier/storage pool is implemented. In one embodiment, a mechanism specifies a constraint on the file blocks co-location. An inode structure is modified to support intra-file tiering and a relationship between two blocks is specified in the inode structure. It should be noted that an inode exists in, or on, a file system and represents metadata about a file. An inode contains information, such as ownership (user, group), access mode (read, write, execute permissions) and file type.

Cloud computing is a model of service delivery for enabling convenient, on-demand network access to a shared pool of configurable computing resources (e.g., networks, network bandwidth, servers, processing, memory, storage, applications, virtual machines (VMs), and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed and automatically, without requiring human interaction with the service's provider.

Broad network access: capabilities are available over a network and accessed through standard mechanisms that promote use by heterogeneous, thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or data center).

Rapid elasticity: capabilities can be rapidly and elastically provisioned and, in some cases, automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active consumer accounts). Resource usage can be monitored, controlled, and reported, thereby providing transparency for both the provider and consumer of the utilized service.

Service Models are as follows:

Software as a Service (SaaS): the capability provided to the consumer is the ability to use the provider's applications running on a cloud infrastructure. The applications are accessible from various client devices through a thin client interface, such as a web browser (e.g., web-based email). The consumer does not manage or control the underlying cloud infrastructure including network, servers, operating systems, storage, or even individual application capabilities, with the possible exception of limited consumer-specific application configuration settings.

Platform as a Service (PaaS): the capability provided to the consumer is the ability to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application-hosting environment configurations.

Infrastructure as a Service (IaaS): the capability provided to the consumer is the ability to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is a service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node/cluster is shown according to an embodiment. Cloud computing node/cluster 10 is only one example of a suitable cloud computing node/cluster that may be utilized in storing/processing Big Data and is not intended to suggest any limitation as to the scope of use or functionality of embodiments described herein. Regardless, cloud computing node/cluster 10 is capable of being implemented and/or performing any of the functionality set forth herein.

In cloud computing node/cluster 10 there are multiple computer systems/servers 12, which are operational with numerous other general purpose or special purpose computing system environments or configurations. The multiple computer systems/servers 12 are connected through connections 82 (such as fiber optics, etc.). Although specific details of one computer system/server 12 are shown in FIG. 1, the details apply to the other computer systems/servers 12 in the computer node/cluster 10. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

Figure 2:
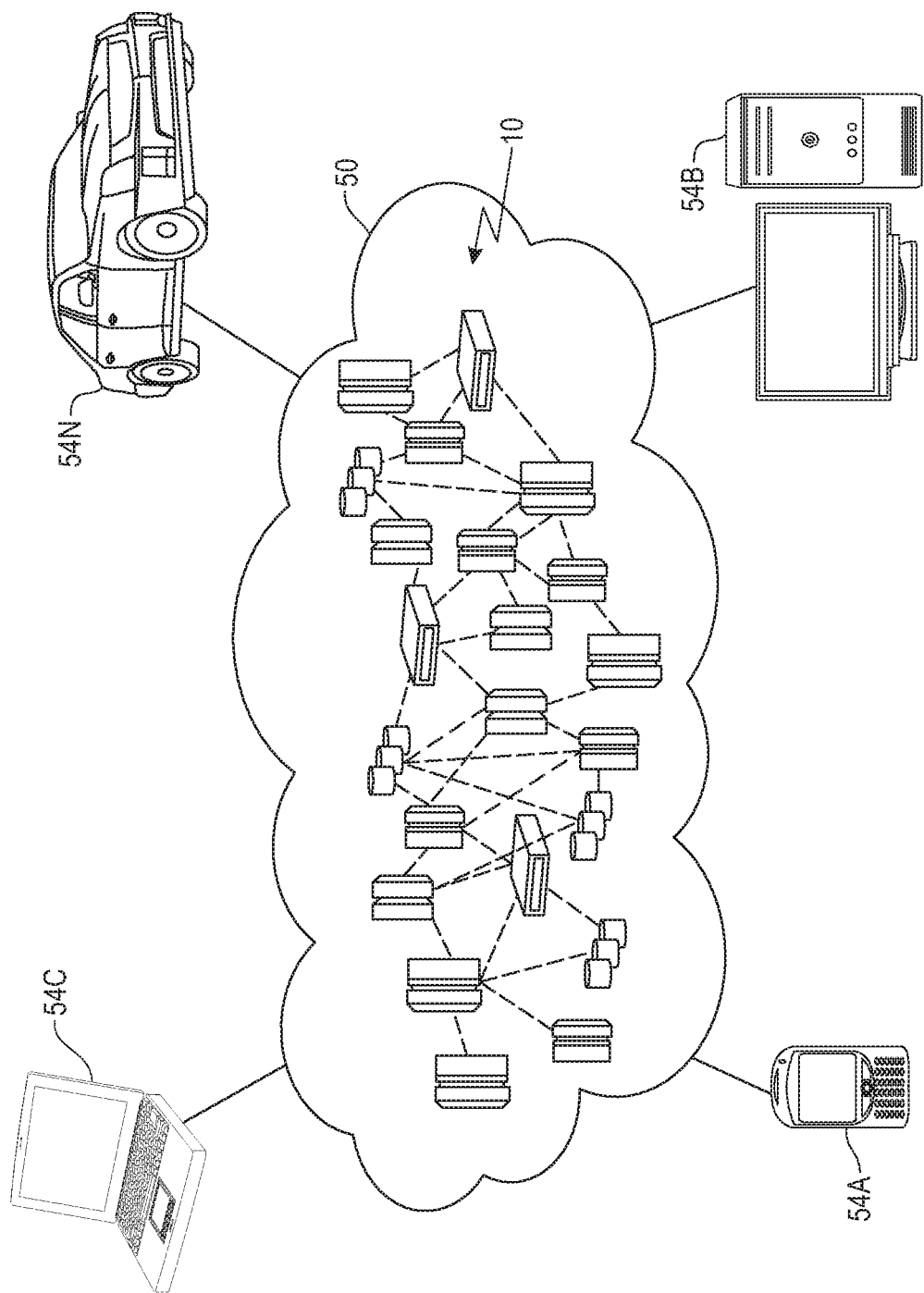
FIG. 2 illustrates a cloud computing environment, according to an embodiment.

As shown in FIG. 2, computer system/server 12 in cloud computing node/cluster 10 is shown in the form of a general-purpose computing device. The components of computer system/server 12 may include, but are not limited to, one or more processors or processing units 16, a system memory 28, and a bus 18 that couples various system components including system memory 28 to processor 16. The processor units 16 include processing circuitry (processor circuits) to read, process, and execute computer executable instructions as understood by one skilled in the art.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media. System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive," "hard disk," and/or "hard disk drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of the embodiments.

The memory 28 by way of example, and not limitation, may include an operating system, one or more application programs, other program modules, and program data. The operating system, one or more application programs, other program modules, and program data (or some combination thereof) may include an implementation of a networking environment.

Additionally, the computer system/server 12 includes flash memory 75 (also referred to as flash). The flash memory 75 stores Big Data along with the hard disk drive 34 as discussed herein according to embodiments. The flash memory 75 includes the FlashQueryFile 80. The FlashQueryFile 80 may be stored in other portions of memory 28. The FlashQueryFile 80 has program modules 42 (which may be one or more software applications) that carry out the functions and/or methodologies of embodiments as described herein. The FlashQueryFile 80 may implement algorithms discussed further herein. Although features of the FlashQueryFile 80 are highlighted in a single computer system/server 12, the FlashQueryFile 80 (and its functionality) may be distributed across other computer systems/servers 12 in the computing node/cluster 10. The FlashQueryFile 80 is configured with all software elements needed to implement embodiments discussed herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Referring now to FIG. 2, an illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as private, community, public, or hybrid clouds as described hereinabove, or a combination thereof. This allows the cloud computing environment 50 to offer infrastructure, platforms, and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
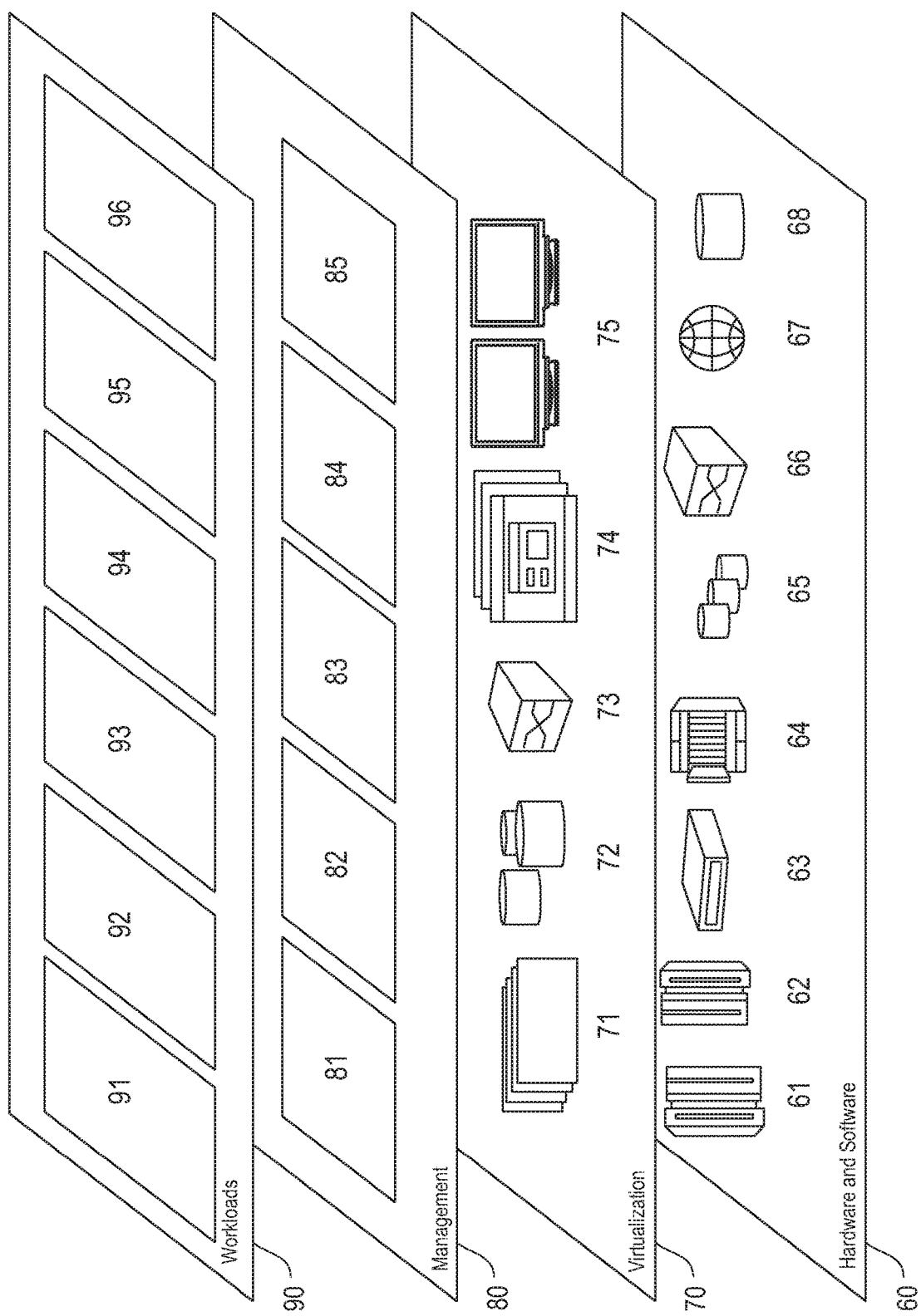
FIG. 3 illustrates a set of abstraction model layers, according to an embodiment.

Referring now to FIG. 3, a set of functional abstraction layers provided by the cloud computing environment 50 (FIG. 2) is shown. It should be understood in advance that the components, layers, and functions shown in FIG. 3 are intended to be illustrative only and the embodiments are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, a management layer 80 may provide the functions described below. Resource provisioning 81 provides dynamic procurement of computing resources and other resources that are utilized to perform tasks within the cloud computing environment. Metering and pricing 82 provide cost tracking as resources are utilized within the cloud computing environment and billing or invoicing for consumption of these resources. In one example, these resources may comprise application software licenses. Security provides identity verification for cloud consumers and tasks as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and block level tiering and co-allocation processing 96. As mentioned above, all of the foregoing examples described with respect to FIG. 3 are illustrative only, and the embodiments are not limited to these examples.

Figure 4:
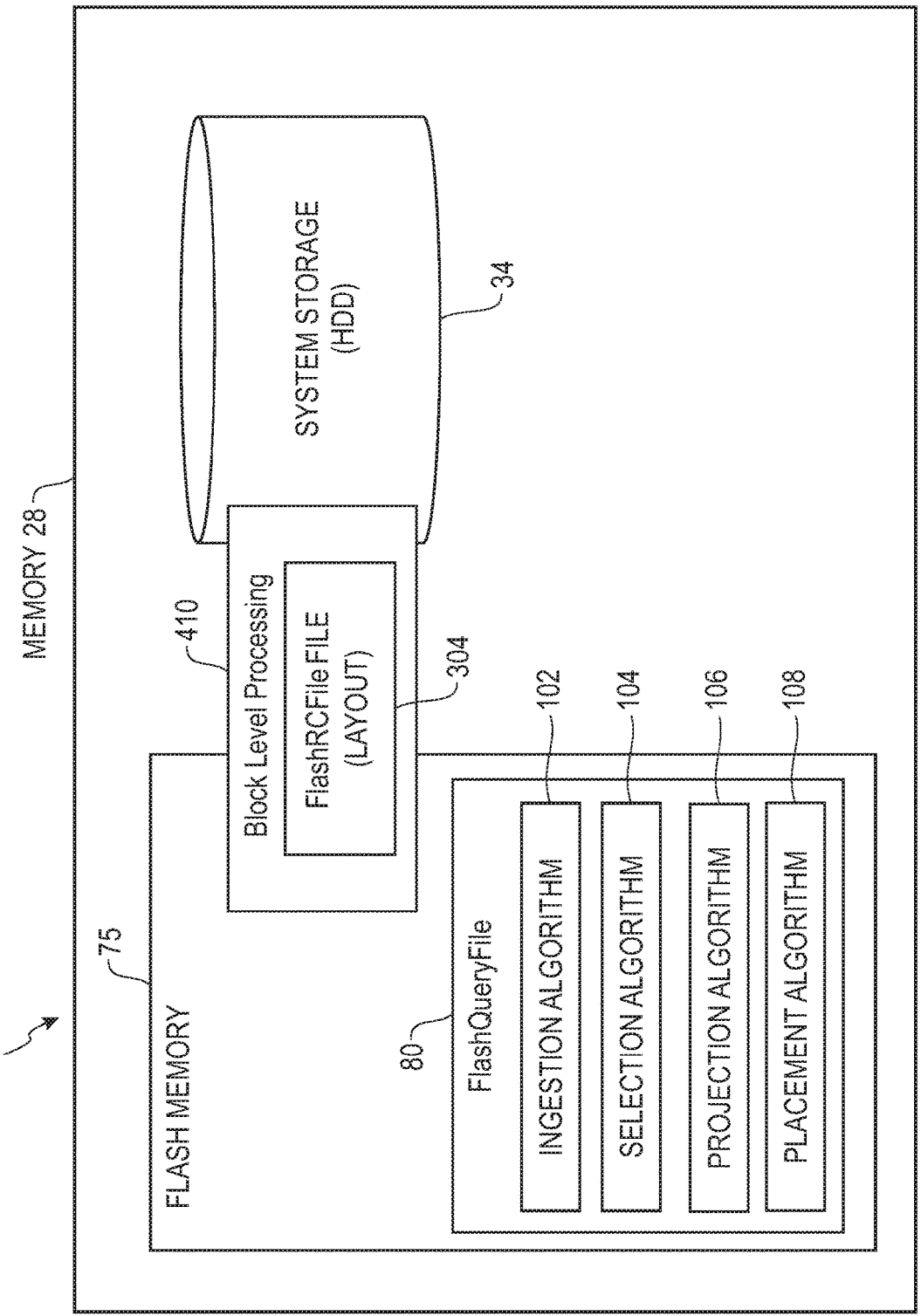
FIG. 4 illustrates further details of features in a computer system/server according to an embodiment.

It is understood all functions of one or more embodiments as described herein are typically performed by the system shown in FIG. 4, which can be tangibly embodied as modules of program code 42 of program/utility 40 (FIG. 1). However, this need not be the case. Rather, the functionality recited herein could be carried out/implemented and/or enabled by any of the layers 60, 70, 80 and 90 shown in FIG. 3.

It is reiterated that although this disclosure includes a detailed description on cloud computing, implementation of the teachings recited herein are not limited to a cloud computing environment. Rather, the embodiments are intended to be implemented with any type of clustered computing environment now known or later developed.

In Big Data SQL analytics, database tables are stored as files in specialized file formats (e.g., Parquet, ORCFile, etc.). Each file format has an associated IO serializer and deserializer (serde) that reads and writes to the file. For Big Data, storage performance for query processing can be enhanced by: reducing the data that needs to be scanned per query by using IO-efficient serializer/deserializer (serdes) and columnar layouts, relying on scale-out parallelism for higher IO throughput, and/or leveraging faster mediums, such as memory or flash for fast access to data.

State-of-the-art Big Data SQL analytics file formats and associated serializers and deserializers are designed for HDDs, in which all architectural decisions, data structures, projection algorithms, selection algorithms, and join algorithms, along with parameters, are based on the fundamental performance characteristics of HDDs. Random I/O is avoided as much as possible given the high seek times inherent in HDDs, and sequential accesses are emphasized as they are orders of magnitude faster than random accesses on HDDs. One way to leverage faster and randomly accessible storage mediums, such as flash in the storage hierarchy, has been via reactive tiering. In reactive tiering, the storage module monitors the access patterns to the data and moves data that is getting accessed frequently to the high performance flash tier (i.e., flash memory). Such a movement is done transparently without any application awareness. As a result, the application continues to access the data which is now residing on flash with the same algorithms, prefetching mechanisms, application program interfaces (APIs) that were inherently designed for hard disks. As a result, the performance achieved is only a fraction of the performance achievable with flash optimized algorithms and code. As used in the state-of-the-art, simple data placement of one of the existing Structured English Query Language (SQL) file formats in flash while using HDD-optimized algorithms and assumptions is able to leverage very little performance gain and fine-grained data skipping, which are otherwise achievable with such randomly accessible mediums. In order to extract optimal performance/$ to justify the higher cost of flash, the transition from sequentially accessed HDDs to randomly accessible storage mediums such as flash mandates a reexamination of fundamental design decisions, data layouts, selection, and projection operators of the serdes.

FIG. 4 shows memory 28 with block level processing 410, according to one embodiment. One optimization technique involves a flash optimized serdes referred to as FlashQueryFile 80 for SQL over Big Data stored in the computer nodes/cluster 10. FlashQueryFile's selection algorithm 104, projection algorithm 106, ingestion algorithm 102, data layouts provided by FlashRCFile File (layout) 304, and metadata are optimized for randomly accessible storage such as flash (flash memory 75) to yield improved performance/$. FlashQueryFile 80 is storage tiering aware and provides a mechanism for predictive placement (via placement algorithm 108) of a subset of flash-appropriate, popular columns in the flash tier (flash memory 75) in an application-aware manner. This allows FlashQueryFile 80 to provide upfront performance guarantees to ad hoc analytical queries. FlashQueryFile 80 reduces query processing latency by only reading data absolutely necessary for the query during selections and projections by fundamentally redesigning data structures and metadata to allow fine-grained data skipping and by leveraging predicate pushdown and late materialization. FlashQueryFile 80 also exploits data access parallelism in its selection algorithm which is made possible by internal IO parallelism allowed by flash. FlashQueryFile 80 carefully considers characteristics of flash 75 in balancing sequential and random accesses in the scan algorithm which is very important as each random access also has an API overhead associated with it. Naively making a number of small random accesses instead of one large sequential access can actually hurt performance if the API call overhead becomes dominant. FlashQueryFile 80 can show the importance of using high-performance IO APIs, object serialization and deserialization, and data structures to be able to derive the performance benefits of flash. Using APIs that are inherently designed for hard disks such as APIs that aggressively buffer and prefetch can actually negate the performance advantages of flash 75. As described further below, the FlashQueryFile 80 may be improved using block level processing 410 for intra-file block tiering and/or intra-file block co-location, according to one or more embodiments.

Conventionally, existing research has mainly looked at incorporating flash in update-heavy, online transactional processing (OLTP) workloads. Some work has been done for leveraging flash in analytical processing (OLAP) workloads. The FlashQueryFile 80 provides a flash-optimized serde for Big Data analytical query processing, and is enhanced by intra-file block placement and colocation processing 410 according to one or more embodiments.

Flash is less expensive than capacity-constrained RAM and is also better for being used as a second level cache than adding extra RAM. A large number of recent works, on making Hadoop faster for queries and iterative computing, are heavily dependent on very large RAM sizes. Flash can achieve much higher performance/$ than RAM as it allows much higher capacities than RAM at a much lower cost. Flash is also much more energy-efficient and energy-proportional than hard disks; further, making it an attractive choice for storage in Big Data clusters where a reduction in energy costs has a significant impact on the total cost of ownership. Furthermore, flash is very desirable for storing map output of Map Reduce jobs and increases performance by 3× of sort and other benchmarks that result in a significant amount of intermediate data. Overall, high performance, small footprint, low power consumption, falling prices, and non-volatility of flash is making it highly desirable as a storage tier/cache in Big Data clusters.

Figure 5:
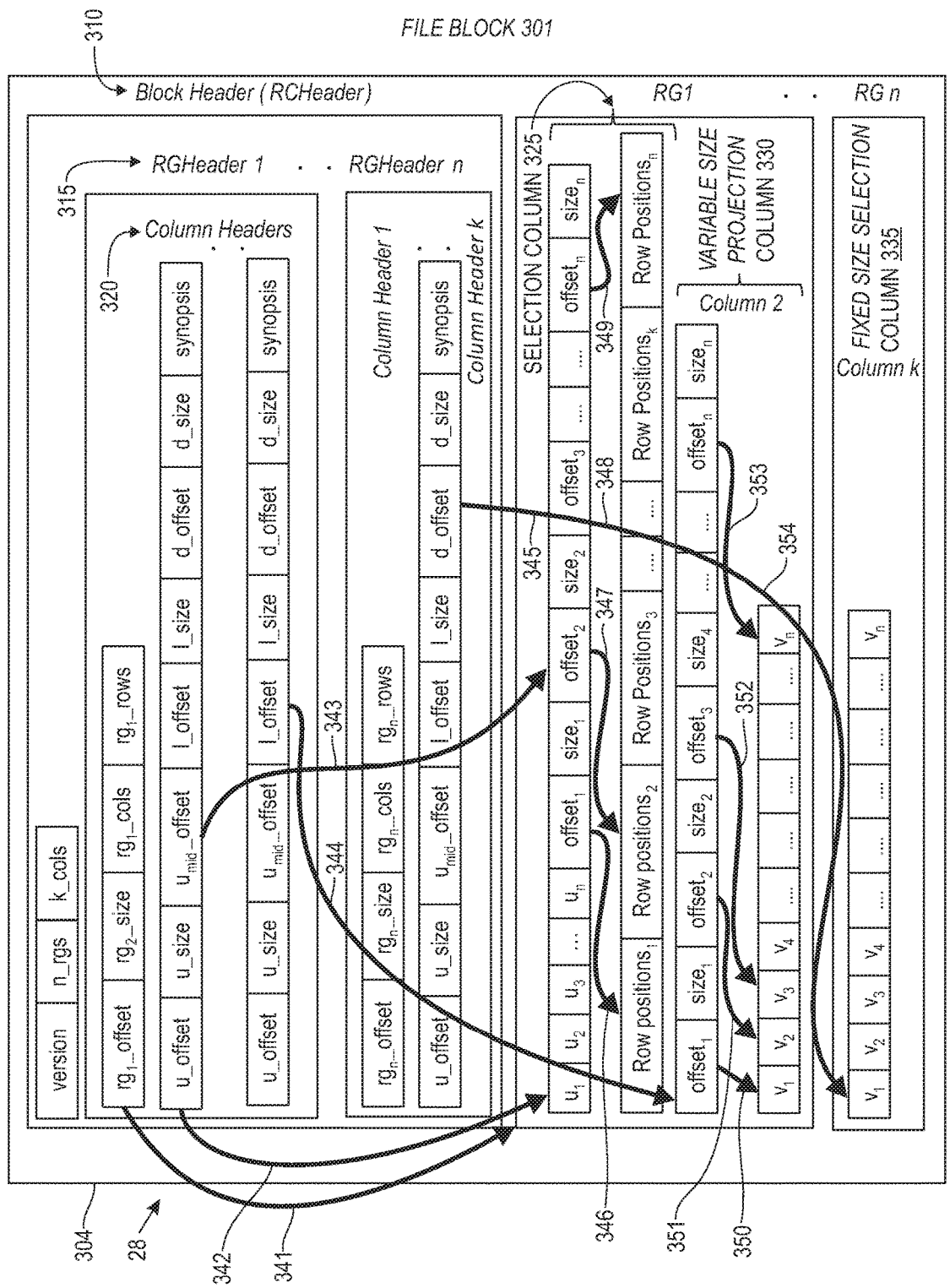
FIG. 5 illustrates how a table is logically represented as a single FlashQueryFile file/layout in distributed file system (DFS) blocks across the computer systems/servers in the node/cluster.

FIG. 5 illustrates how a table may be logically represented as a single FlashQueryFile file/layout 304, which is split (stored) into multiple distributed file system (DFS) blocks (by the FlashQueryFile 80) that are spread across the computer systems/servers 12 in the node/cluster 10 according to an embodiment. Although FIG. 5 shows a file block 301 stored in memory 28, the file block 301 represents numerous file blocks 301 distributed across multiple computer systems/servers 12 in the node/cluster 10. FIG. 5 also emphasizes metadata headers stored in the flash memory 75 as discussed below.

Accordingly, a column in FlashQueryFile file/layout 304 is horizontally partitioned into multiple row groups, each containing a configurable number of rows. A file block 301 contains multiple row groups. FlashQueryFile 80 maintains metadata headers at three different levels: 1) block-level header called RCHeader, 2) row-group-level header called RGHeader, and 3) column-level header called ColHeader. The headers (i.e., RCHeader 310, RGHeader 315, and ColHeader 320) maintain data structures for facilitating fast random accesses to the necessary data and to allow fine-grained data skipping. The metadata headers RCHeader 310, RGHeader 315, and ColHeader 320 each include metadata that can be read by the FlashQueryFile 80 to determine when to skip an entire file block (and then move on to the next file block), skip a row group (and then move on to the next row group), and/or skip a column (and then move on to the next column), while executing a query (e.g., the selection phase/part of the query). As an example, a selection column 325, a low cardinality projection column 330, and a very high cardinality projection column 335 are shown.

The (file block) RCHeader 310 contains the number of row groups (n_rgs) in the file block and version number which aids the FlashQueryFile 80 software in maintaining backward and forward compatibility across various versions of the file block structure during the lifetime of deployment. The RGHeader 315 header includes the offset of the start of the row group in the file block (rg_offset) and the size of row group in the file block (rg_size). The RGHeader 315 also contains the number of rows and columns present in the row group. For example, if the row group size is configured to be 10 million for a file block, the rg_rows field would contain 10 million as the value.

The ColHeader 320 maintains file offset pointers for various possible columnar layouts in the file block. The file offset and size of the dictionary of a column is maintained in u_offset and u_size respectively. The u_offset and u_size fields are populated for FlashQueryFile layouts that leverage dictionary (e.g., the selection dictionary and/or the projection dictionary) for fast projection and selection. The l_offset and l_size fields contain file offset of the lookup structure used in the projection-optimized layout. Fields d_offset and d_size contain file offset of data of columns that are stored as-is (for e.g., columns with cardinality=1 are stored as is without any dictionary). As executed by the FlashQueryFile 80, arrows 341, 342, 343, 344, 345, 346, 347, 348, 349, 350, 351, 352, 353, 354 illustrate relationships and uses of the metadata headers. The arrows 341-354 illustrate the relationship between an offset field and the data structure the offset filed is pointing to in the file block 301.

Data types in all the structures have been carefully selected keeping space-efficiency in perspective. FlashQueryFile 80 maintains two data layouts in FlashQueryFile file 304 (decided by an ingestion algorithm 102): one optimized for selection phase/part of a query and the other optimized for the projection phase/part of the query. While the predicate values, and order and number of the columns changes across ad hoc queries, some columns do tend to be popular as either projection or selection columns. For example, in TPCH dataset, two columns, L_EXTENDEDPRICE (not shown) and L_DISCOUNT are the most popular projection columns. Their popularity is intuitive as TPCH is modeled as a financial benchmark; these numeric columns deal with money and aggregations can happen only on numeric values. Columns with date type such as L_SHIPDATE (in FIG. 2B) are very popular as a selection column as date is typically an important dimension in the analytical queries. Similarly, primary and foreign keys are popular selection columns. FlashQueryFile 80 offers three data formats for columnar data: one format optimized for fast selection for popular selection columns, the other format optimized for the fast projection for popular projection columns, and a third format is a hybrid layout used for columns that are being used as projection and/or selection columns (different times in a query). The default layout is the hybrid format, where the administrator and/or a predictor module (in the FlashQueryFile 80) can choose a selection-only or a projection-only layout for better space-efficiency than the hybrid layout. Earlier analysis of industry traces has also found that the set of selection columns remains very predictable even in ad hoc analytical queries. Guided by such observations, FlashQueryFile 80 (via ingestion algorithm 102) optionally allows users and/or query engines to mark some columns in the table as columns that are only projected columns, only selected columns, and/or a combination of projected columns and selected columns. Accordingly, the FlashQueryFile 80 (via ingestion algorithm 102) leverages factors for this information (i.e., the columns marked as in the table as columns that are only projected columns, only selected columns, and/or a combination) in its data layout decision for space efficiency (in the FlashQueryFile file 304). The ingestion time algorithm 102 is described in Table 1 below. Note that a primary key is a column or group of columns that uniquely identify a row. Every table should have a primary key, and a table cannot have more than one primary key. The primary key characteristic can be specified as part of a column definition, as in the first column of a table, or it can be specified as a separate clause of the CREATE TABLE statement. A foreign key is a column or set of columns in one table whose values must have matching values in the primary key of another (or the same) table. A foreign key is said to reference its primary key. Foreign keys are a mechanism for maintaining data integrity.

TABLE 1

Flash-Optimized Ingestion Algorithm

Require: rows to be ingested in the table, configurable number of rows in each row
group (RG) return Flash-optimized file block layout
    for all rows getting ingested do
        buffer rows in memory
        if number of buffered rows in memory = = RG size then
            populate fields of corresponding row group header RGHeader in block
            header RCHeader
            store offset in the file block of the new row group in RGHeader
            for all columns in the ingested rows do
                if column's destination has been designated as flash then
                    use flash file block for storing this column's headers and data
                else
                    use HDD file block for storing this column's headers and data
                end if
                if column has been designated as "selection only" then
                    Determine min, max, mid, median, and average value and populate
                    synopsis in the column header. Also store the sort order and
                    cardinality of the column in the synopsis
                    if column cardinality = 1 and column unsorted then
                        sort columnar data
                        create optimized dictionary which first stores the columnar
                        data and then for each value in the data, it serializes the
                        corresponding row position of the column
                        mark u_offset and u_size entries in the column header to
                        the offset of the columnar data
                    else if column cardinality = 1 and column is sorted then
                    serialize the columnar data as is to the file block
                    store offset to the columnar data in the d_offset and d_size fields in
                    the column header
                    else if column is unsorted and cardinality < 1 then
                    populate fields in the corresponding column header in the
                    RGHeader
                    determine set of unique values occurring in the columnar data
                    determine row positions where each unique value occurs in the row
                    group
                    create data structure (henceforth, addressed as dictionary) that
                    maintains a sorted array of each unique value, the array offset to
                    the blob containing the row positions pertaining to the unique
                    value
                    serialize the data structure to the file block
                    store the file block offset and size of the serialized data structure in
                    the u_offset field in the column header
                    store the file block offset of the middle value of the column in the
                    serialized data structure in the u_mid_offset field in the column
                    header
                  else if column is sorted and cardinality < 1 then
                      identify the unique values and create a dictionary
                      skip the dictionary sort step as data is already sorted
                      identify ranges of row positions for each unique value
                      store the row position blobs for each unique value as a
                      structure containing start and end row position pertaining to
                      the value.

TABLE 1-continued

Flash-Optimized Ingestion Algorithm

```
                For every unique value, store an offset to the row position
                structure
                Set the u_offset and u_size fields in the column header to
                the dictionary offset
            end if
            if column has been designated as "projection only" column then
                if column is sorted and cardinality < 1
                    identify the unique values and create a dictionary
                    store the file block offset and size of the dictionary in the
                    u_offset and u_size field in the column header
                    identify ranges of row positions for each unique value
                    create an optimized lookup structure which stores start and
                    end row position pertaining to each value in the dictionary.
                    Store the l_offset and l_size of the lookup structure in the
                    column header
                else if column is sorted and has cardinality == 1 then
                    Serialize the column data as is to the file block
                    store the file block offset and size of the data in the d_offset
                    and d_size field in the column header
                else if column is unsorted and has cardinality << 1 then
                    identify the unique values and create a dictionary
                    store the file block offset and size of the dictionary in the
                    u_offset and u_size field in the column header
                    create lookup structure that maps each row position in the
                    column to the directory index of its value
                    store lookup structure's offset in the l_offset and l_size
                    field of the column header
                else if column is unsorted and cardinality > threshold
                    serialize the data of the column to the file block
                    store the file block offset and size of the data in the d_offset
                    field in the column header
                    if column is variable length then
                        create lookup structure that stores file block offset and
                        size of each row value in the column
                        serialize the lookup structure to the file block
                        store file block offset and size of lookup structure in
                        the l_offset and l_size fields of the column header
                    end if
                else if column is both selection and projection column
                    repeat steps earlier albeit in a much more space-efficient
                    manner to reduce redundancy between the projection and
                    selection data structures
                end if
            end for
        end if
        if number of Row Groups == Rows Groups allowed per file block then
            serialize the main block header RCHeader to the designated offset in the
            file block
            start a new file block
        end if
    end for
```

FIG. 6 illustrates the original relationship 401 (database table "lineitem") of columns and rows having data values in a table. The table is ingested into the computer systems/servers 10 by the FlashQueryFile 80 to be optimized for flash memory. The table is not stored in the original relationship. The blocks of the table are stored as a file lineitem 601. A serializer constructs the blocks as the rows are ingested into the computer system/servers 10, and the file system spreads the blocks on the cluster over one or more system/servers 10.

FIG. 7 illustrates a (basic) selection optimized layout for a variable sized popular projection column. From the original relationship 401 of the table in FIG. 6, a selection optimized data layout 402 shown in FIG. 7 has been designed (by FlashQueryFile 80 for storage) to facilitate fast predicate match and to reduce data read during the selection clause/part (e.g., the where clause containing the predicate). For each potential selection column, FlashQueryFile 80 extracts the unique values occurring in each row group of the column and stores the unique values contiguously in selection dictionary 403. Column header maintains an offset (off) to the start of the unique values. Next, for each value, FlashQueryFile 80 stores offsets 450 (abbreviated off and/or O) and length (i.e., size) of the set of row positions where each unique value occurs in the column (not shown in FIG. 47 but shown in FIG. 5). Finally, FlashQueryFile 80 stores the sets of row positions for each unique value in row positions designation 405. The offsets 450 correspond to the location of each gathering/grouping of row positions for an individual unique value. In the metadata header, FlashQueryFile 80 also keeps track of (stores) maximum, minimum, mid, average, and count of the entries in the column per row group. Maximum refers to the maximum value, minimum refers to the minimum value, mid refers to the middle value, average refers to the average value occurring in every row group of a column. Count refers to the number of rows in the row group of the column. As compared to the original relationship table 401 in FIG. 6, selection optimized data layout 402 is a different way to store column C1 without having to repeat storage of the same data values.

A Big Data file system cluster typically has multiple servers that act as data nodes and files are split into blocks at the ingestion time and spread across the cluster. Each block contains a configurable number of rows in the dataset. In one embodiment, the FlashQueryFile 80 splits the block into two sub-blocks, where one sub-block contains a subset of popular columns determined as flash-suitable, and the second sub-block contains remaining columns.

High performance, randomly accessible storage devices such as Flash are much more expensive and have smaller capacities than HDDs. Also, Flash offers 10-1000× higher random IOPs than HDD, while the sequential bandwidth is only 3-7× higher than HDD. Thus, placing data that is only going to get sequentially accessed on Flash stands to achieve lower performance per dollar than placing data that is mostly going to be randomly accessed. Not all the popular data yields high performance per dollar by getting placed on high performance, randomly accessible tier. Embodiments involve a placement decision making mechanism that carefully chooses the blocks of columnar data to be placed on the most conducive tier to attain optimal performance per dollar, where blocks may be co-located for an index node (inode) data structure for different memory types (i.e., HDD and SDD/flash).

Historical and run-time query information for the large database may also be used to select the storage device that each block of a column is stored on. The historical query information includes the type of usage for each block of a column in the query (e.g., select clause (i.e., projection), where clause (i.e., selection), join, etc.), the selectivity of the query, etc. The historical query information is used to create an inter- and intra-query column block relationship graph where the edges define the selection/projection/join relationship between any two columns in a query. Each relationship edge has a weight associated with it which is determined by using an optimization algorithm that seeks to maximize performance per dollar of the queries subject to capacity constraints. In embodiments in which historical query logs are not present, the column relationship graph (based on column blocks) is constructed during run-time based on the incoming queries. At the ingestion time, the column relationship graph is ranked and each column block is assigned a score. Column blocks with higher scores are placed on higher performance storage devices.

A multi-tier enterprise storage system for storing a large database may include a computer system (e.g., computer system/server 12 (FIG. 1) that is in communication with a first storage device and a second storage device. The first storage device may include one or more high performance, randomly accessible storage devices such as Flash, and the second storage device may include one or more low performance storage devices, such as HDDs. The computer system is configured to receive a workload that includes, for example, a large database, and also configured to store blocks of at least one column of the large database on each of the first storage device and the second storage device. In one example embodiment, the blocks may be co-located on an inode 1110 (FIG. 11) (of lineitem 601) and tiered on the first memory device (e.g., an SDD data block 1121) and the second memory device (e.g., an HDD data block 1120). In exemplary embodiments, the determination of which of the first storage device and the second storage device that each block of a column should be stored on is based on the attributes of the column blocks and on any available historical and run-time query information.

In exemplary embodiments, data blocks for columns of a large database which are more likely to be randomly accessed are stored in the first storage device and data blocks of columns that are more likely to be sequentially accessed are stored in the second storage device. For example, if one or more data blocks of a column (i.e., column in the selection clause of the query) has low cardinality, it will mostly benefit from getting accessed sequentially as a large number of row positions may match the predicate and should therefore be stored in the second storage device. On the other hand, one or more data blocks a column with high cardinality may match only a few rows has more chances of getting accessed randomly and be stored on the first storage device. In one or more embodiments, by only storing data blocks of columns of the large database which are more likely to be randomly accessed in first storage device, the performance gains per dollar realized by the first storage device can be maximized.

In exemplary embodiments, the determination of which blocks of columns of the large database to store on the first storage device may also be based on the characteristics of the first storage device and the second storage device. The characteristics of the first storage device and the second storage device may include, but are not limited to, sequential access time, random access time, capacity, latency, and the like. In one embodiment, if data blocks of a column of the large database are likely to be accessed randomly they may not be stored on the first storage device if it is determined that the data blocks will exceed a threshold percentage of the capacity of the first storage device. In one or more embodiments, the performance characteristics of the first storage device and the second storage device are very different and the selection of which device to store each data block of a column on is designed to take advantage of these differences.

In one or more embodiments, each of the data blocks of columns of the large database may be given a score by the computer system based on the ranking of the intra- and inter-query weighted column relationship graph. In one or more embodiments, the score represents the likely performance gain per dollar that will be realized by storing the data blocks of a column on the first storage device rather than the second storage device. The data blocks of columns to be stored on the first storage device are then selected based on the score for each data block of a column, the size of each column data block and the capacity of the first storage device. A common way to exploit high performance storage devices is to place frequently accessed, popular data blocks on such devices. However, such a naive technique does not yield optimal performance per dollar. Hence, in one or more embodiments, not all popular column data blocks will be placed in the first storage device. For example, data blocks of a column that are accessed very frequently but in a sequential manner may not have a high enough score to be selected for storing it in the first storage device if the first storage device is flash. The column data blocks that are typically projected, are assigned a higher weight than the column data blocks that are typically in the selection side of the query. Part of the information (such as a dictionary of the unique values) of the column data blocks that typically occur in the selection clause is kept by default on the first storage device. The ranking will determine the placement only of the remaining part of the columnar data blocks that contain row positions for each unique value.

Figure 8:
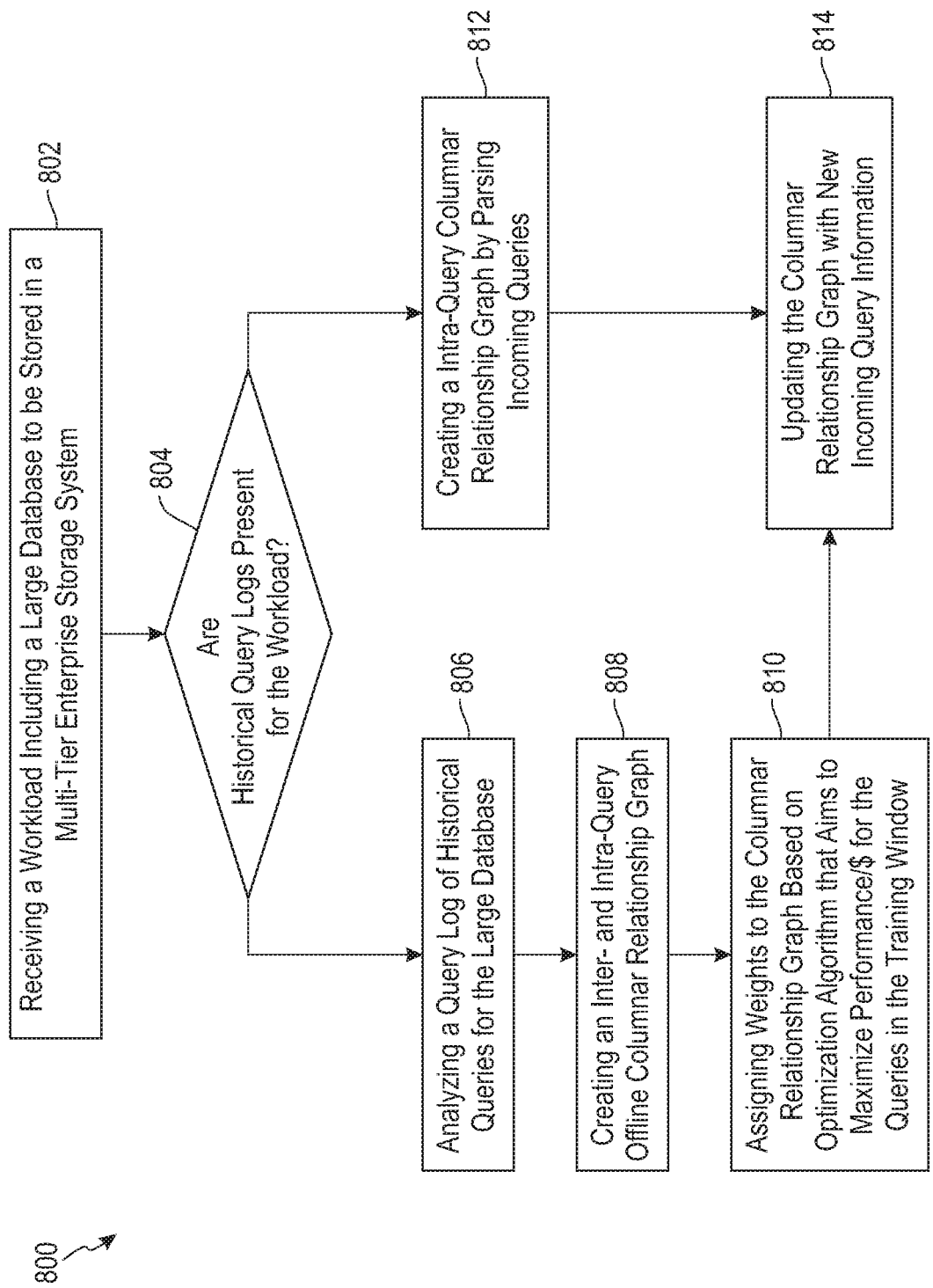
FIG. 8 illustrates a flowchart diagram of offline and run-time creation of predictive model to guide run-time columnar data placement.

FIG. 8 illustrates a flow chart diagram illustrating a process 800 for generation of a predictive model that may be used to guide the run-time columnar block data placement decision in accordance with an embodiment. In one or more embodiments, the determination of which storage device of the multi-tier enterprise storage system that each data block of a column should be stored on may be based on historical and run-time query information for the large database. As shown at block 802, the process 800 begins by receiving a workload including a large database to be stored in a multi-tier enterprise storage system. Next, as shown at decision block 804, the process 800 includes determining if historical query logs present for the workload. If historical query logs are present, the process 800 proceeds to block 806 and analyzes a query log of historical queries for the large database. Next as shown at block 808, the process 800 includes creating an inter- and intra-query weighted column relationship graph based on the analysis. In one or more embodiments, each column in a query is connected to other columns in the same query based on its occurrence in the selection, projection, or join clause. For example, two columns that both occur in the projection clause will be connected by a select-select relationship. If one column occurs in the selection clause and other in the projection clause, they will be connected by a select-where relationship. As shown at block 810, the process 800 also includes assigning weights to the columnar relationship graph based on optimization algorithm that aims to maximize performance per dollar for the queries in the training window.

If historical query logs are not present, the process 800 proceeds to block 812 and the predictive model in form of column relationship graph is created during run-time by parsing the incoming queries. In one or more embodiments, for select clauses (i.e., the columns that are being projected) the distribution of the rows examined/projected by the historical and run-time queries which have the column in the select clause will be evaluated. If the percentage of rows examined by the select clause is low it indicates that the column can stand to gain performance by getting accessed randomly only at desired row positions. However, if the percentage of rows examined by the select clause is higher than a selectivity threshold, it indicates that the column should rather be accessed sequentially. As shown at block 814, the process 800 also includes updating the columnar relationship graph with new incoming query information.

Accordingly, in one or more embodiments, the projection columns that stand to gain performance by getting randomly accessed will be assigned a higher weight so that they have a higher chance of having its data blocks being stored in the first storage device. On the other hand, the columns that would rather be accessed sequentially will be assigned a lower weight so that it data blocks will have a lower chance of being stored in the second storage device.

In one or more embodiments, analyzing the query log includes building an intra-query relationship graph between columns of the large database and assigning a weight to each relationship, or edge between connected columns, based on the contribution of the relationship on performance. Once the weights are assigned, the columns are ranked based on a score which is the sum of the weights of the incoming edges. In one or more embodiments, the values of the weights are determined by modeling the performance experienced by each column in each query in the historical log and maximizing the performance subject to constraints, such as the size of the first storage device.

In one embodiment, if a column is deemed popular as a projection column and the query log indicates that a low percentage of rows are typically examined in the queries involving the column, the placement of the data blocks of the column in the first storage device will result in performance improvement over placement of the data blocks of the column in the second storage device. In addition, if the first storage device allows high IO parallelism, the placement of the data blocks of a column in the first storage device will result in even more performance improvement over placement of the data blocks of the column in the second storage device. In another embodiment, if a column is deemed popular as a projection column and the query log indicates that a high percentage of rows are examined in the queries involving the column, the placement of the data blocks of the column in the first storage device will result in less gain (i.e., the factor of difference in the sequential bandwidth of flash as first storage device compared to HDD as the second storage device) in performance versus placement of the data blocks of the column in the second storage device. Such heuristics guide the weight allocations in the intra-query columnar graph used by the placement algorithm.

In one embodiment, a process for predictively placing data blocks of columns of a large database in a multi-tier enterprise storage system during creation of the large database includes receiving a workload including a large database to be stored in a multi-tier enterprise storage system. The process includes evaluating one or more attributes of the columns of the large database. The weighted columnar relationship graph is ranked and the associated rank of a column is used to guide placement of its data blocks in the storage hierarchy. The process further includes determining based on the one or more attributes if each of the data blocks of columns of the large database should be stored on a first or a second storage device of the multi-tier enterprise storage system. In one or more embodiments, the determination of which storage device of the multi-tier enterprise storage system each data block of a column should be stored on may also be based on one or more characteristics of the storage devices of the multi-tier enterprise storage system.

In one or more embodiments, after the large database has been loaded into the multi-tier enterprise storage system the computer system will monitor the use of the large database and will periodically move data blocks of columns of the large database between the first storage device and the second storage device. Accordingly, the computer system will react to changes in the column data blocks popularity and the relationships between columns in run-time based on the incoming analytic queries. The intra-column relationship graph and the column ranking will change in reaction to the patterns exhibited by the run-time queries. The future data block placement decisions will also change accordingly.

Predictive Column Placement Flash is more expensive and has less space than HDD. It is important to place the right subset of data blocks of columns in flash that yield highest performance/$ in order to justify the higher cost of flash. All column data blocks are not alike and won't yield the same performance/$ by being placed in the flash. Flash yields highest performance/$ when data is accessed randomly as flash is 40-1000× faster than HDD for random IOPs and only 2-7× faster for sequential accesses. Placing data blocks of a column that are likely to get accessed randomly will yield more bang for the buck with flash vs. data blocks of a column that is only going to get accessed sequentially.

A naive way of splitting the column data blocks across a flash tier and an HDD tier is to place the popular column data blocks in the flash tier. Even in workloads with a high percentage of ad hoc queries, some column data blocks are inherently more popular either as selection or as projection column data blocks across queries. While the predicate values, and order and number of the columns changes across the queries, some columns do tend to appear more than others as either projection or selection columns.

In one or more embodiments, the processes described herein use a predictive column data block placement model in a multi-tier storage system that takes into account several additional factors in addition to column data block popularity to yield optimal performance/$ across queries. Various attributes of the column data blocks are considered such as their cardinality, sort order, sparsity, and size in its column data block tiering decision. In addition, training the placement model is performed by analyzing historical (if available) and run-time query logs. If historical query logs are not present, the processes train the model run-time using a configurable window of run-time queries. An intra- and inter-query weighted column relationship graph is created using the query log and weights are assigned using an optimization algorithm which considers the column data block characteristics and its impact on enhancing the performance/$ by getting placed on flash.

A configurable number of queries either in the historical or run-time query log may be used for training the predictive column data block placement model. An intra- and inter-query column relationship graph is created for all the queries in the query window. The relationships between the columns can be either selection-selection, projection-selection, or projection-projection. A higher weight is assigned to the projection-projection relationship as selection algorithm stands to gain the most from being placed in flash and if any one projection column is not placed on flash, it brings down the query. Columns in selection-selection get the least weight as the performance doesn't get as affected by partial placement of some column data blocks in flash. Every column's rank is characterized as:

$$rank(c_i) = \alpha * cardinality + \beta * size + \gamma * sort\_order + \delta * column\_type + \theta * (\Sigma SS(i,j)) + \pi * (\Sigma SP(i,j)) + \varphi * (\Sigma PP(i,j)) \quad (1)$$

where, cardinality is the percentage of unique values in the column, sort order is 1 if the column is sorted and 0 otherwise, popularity is the number of times the column occurs in the queries in the window of consideration, column type specifies the way a column is used in the query and is 0 for selection columns, 1 for projection columns, and 2 if a column is used in both ways. In the summations, j belongs to the list of neighbors that are in corresponding relationship (SS for selection-selection, SP for selection-projection, and PP for projection-projection) with i. The weights of the relationships are dependent on the selectivity of the queries in the training data.

In one or more embodiments, if the selectivity of the query is low (i.e., very few row positions match the predicate), the projection algorithm does a point access to the file offset of the row position to read the value of the projection column. This translates to random accesses and placement of the projection column data blocks in flash yields high performance per dollar gain. On the other hand, if the selectivity of the query is high, and a large number of row positions match the predicate, the projection algorithm reverts to a sequential mode in which it clusters the row positions and reads in large chunks of data from the projection columns. Placement of the projection columns data blocks in flash won't yield as high a performance per dollar gain as the previous scenario. Thus, selectivity of the query has an impact on the performance of a column data block in flash.

For each query, a matrix of all possible combinations of column placement is used as an independent variable. For example, if a query has 7 columns, there are 128 column data placement combinations possible, with even more column data block combinations. A column is represented as a binary where 1 signifies placement on flash and 0 placement on disk. The speedup observed in the query latency (i.e., baseline query latency/tiered query latency) and the cost of the placement form the dependent variables. The cost of a column placement combination is simply a factor of its size*cost of flash memory/GB for the columns placement in flash and size*cost of disk/GB for the columns supposed to be on disk. Every column combination's impact on the query performance (i.e., speedup) is modeled for each query in the query window. The performance characteristics of the hard disk and flash (e.g., bandwidth) are considered in the modeling in addition to the characteristics of the column and the selectivity of the queries.

For simplicity, it is assumed that query latency is the sum of the expected time required for accessing each individual column in the query. Let $C = c_1, c_2, \ldots, c_k$ be the columns occurring in a query.

$$E[Q] = \sum_{i=1}^{k} E[c_i] \quad (2)$$

Let $y_i$ be the label that denotes whether column $c_i$ is placed in flash or in HDD.

$$y[i] = \begin{cases} 1 & \text{if } c_i \text{ is on flash} \\ 0 & \text{if } c_i \text{ is on HDD} \end{cases} \quad (3)$$

The performance modeling is based on the selection and projection algorithms discussed earlier. The query latency is calculated as follows if $c_i$ is residing on flash and is a selection column:

$$E[c_i] = (cardinality_i * RGsize + selectivity(q) * 4 / BW_{flash} \quad (4)$$

As per selection algorithm, each row group is processed in parallel and from each row group, first the unique values are read which correspond to cardinality$_i$*RG size and then matching row positions are read which correspond to selectivity(q)*4, where selectivity(q) is the selectivity of the query being modeled and 4 is the size of each row position. The baseline query performance is determined by reading each column in the query sequentially using disk bandwidth numbers.

If $c_{\{i\}}$ is residing on flash and is a projection column, query latency is calculated as follows:

$$E[c_i] = selectivity(q) * fieldsize_i / BW_{flash} \quad (5)$$

Where, selectivity(q) is the selectivity of the query and fieldsize$_i$ is the field size of column $c_i$. This is an approximation of the projection algorithm.

If i is residing on disk, it is read in its entirety as is the case with the state-of-the-art algorithms. $E[c_i] = size_i / BW_{hdd}$, where size$_i$ is the total size of the column in the file. The resulting matrix is optimized to yield an ordered set of columns that yield the maximum speed-up for all queries while minimizing the cost when placed on flash. The resulting set of columns is then used to determine the values of coefficients $\alpha$, etc. using regression analysis. The rank equation is used to determine the rank of every new column that appears in the data set to determine its placement in the storage hierarchy. Columns are ranked and the column rank is used in determining the placement of the column in the flash; highest ranking columns are placed in flash. In every training round, the query graph is regenerated using the queries in the window and the coefficients are re-determined to ensure currency of the predictive model.

At the time of the initial creation of the database, and in absence of historical query logs for similar databases, a bootstrapping placement algorithm decides the initial placement of the columns based on observed column characteristics and heuristics. In a first step, a configurable number of rows being ingested are buffered in memory. The characteristics (e.g., cardinality, sort order, etc.) are learnt from the buffered rows.

In one or more embodiments, the bootstrapping algorithm also needs to know the potential usage of the columns as selection or projection columns. It also attempts to figure out potential popularity of the columns. Potential popularity columns can be done in multiple ways: 1) hints provided by the user, 2) insights garnered from the dataset, field types, names, advisories acquired from an application, etc. For example, in a table, the primary and foreign keys tend to occur in a large number of queries and hence, are inherently popular selection columns. In a financial dataset, columns with monetary attributes (e.g., tax, discount, price, salary, etc.) tend to be popular projection columns for aggregation queries. For example, in the TPCH dataset which is modeled after financial datasets, in the line item table, l_discount and l_xtendedprice are the most popular projection columns.

Heuristics are then used to determine the placement of the columns based on the characteristics determined earlier. The heuristics are informed by the projection and selection algorithms. To understand the intuition behind the heuristics, the placement decision of selection columns which is informed by the selection algorithm is described. The first part in the algorithm involves a sequential read of the unique values for performing predicate match. The second part has potential for much more random accesses as it involves reading row position blobs for each value that matches the predicate. If the row position blobs are small in size and if a large number of unique values match the predicate, the second part of the algorithm leads to a large number of random accesses. Such scenario occurs when the cardinality of the column is high and placing column data blocks in flash will yield higher performance per dollar of the selection algorithm. On the other hand, if the row position blobs are very large in size, fetching the row position blobs after the predicate match results in a few number of large sequential accesses; a scenario typical with column with low cardinality. Placing such column data blocks in flash allows lower performance per dollar of the selection algorithm. Size of the column also plays a similar role in the performance per dollar yield. The placement heuristic ranks higher the columns with high cardinality.

Figure 9:
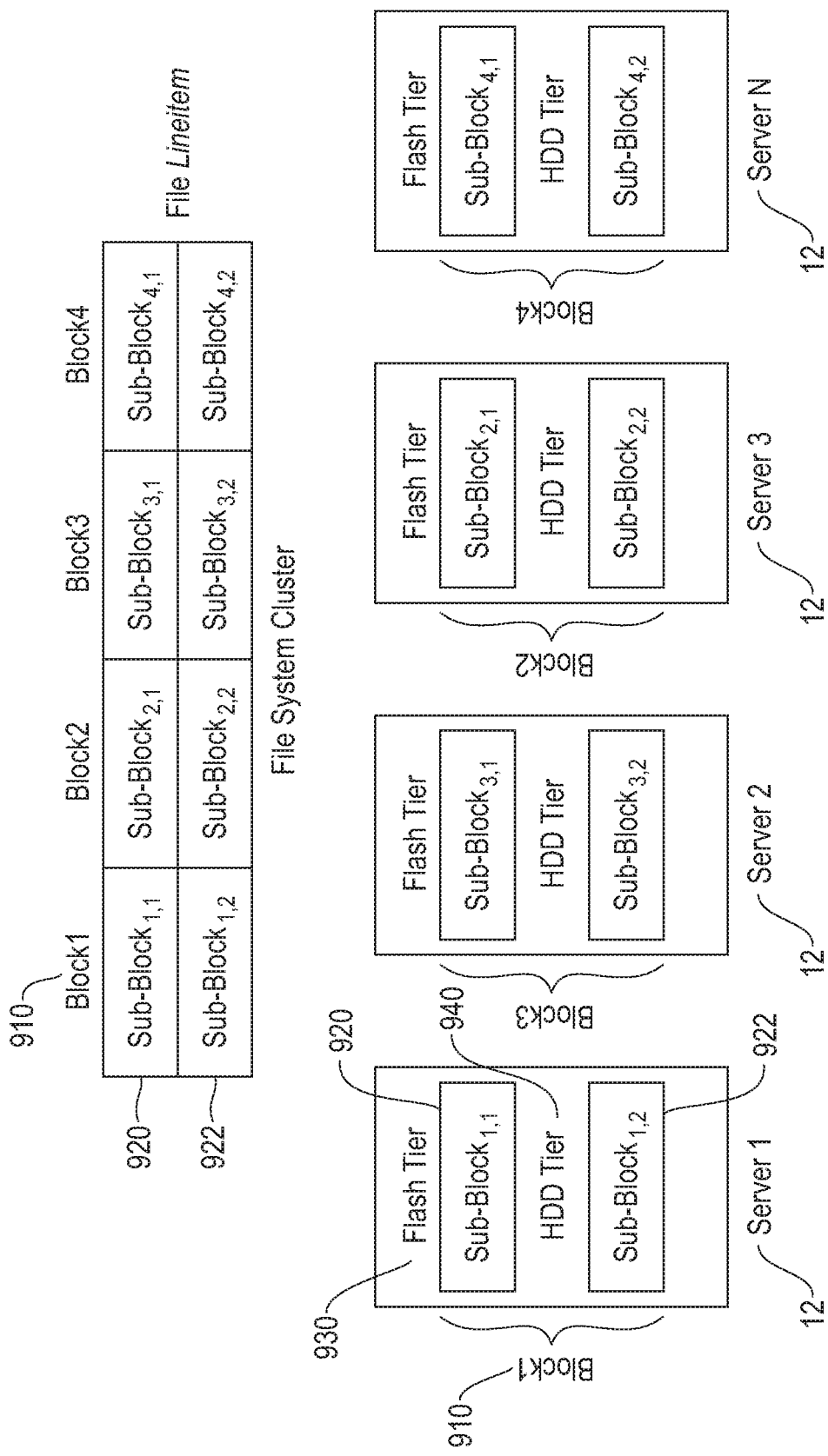
FIG. 9 illustrates splitting of blocks into sub-blocks, according to an embodiment.

FIG. 9 illustrates an example of splitting blocks 910 into sub-blocks 920, 922, according to an embodiment. In one embodiment, the blocks 910 and the associated sub-blocks 920 and 922 are split using the file lineitem 601. The associated sub-blocks 920 and 922 are then co-located on a server 12 in an SDD or flash tier 930 and HDD tier 940. In one embodiment, a FlashQueryFile serializer of the FlashQueryFile 80 constructs file system blocks 910 as rows keep getting ingested into the database table 401. The FlashQueryFile serializer splits each file system block 910 into two sub-blocks 920 and 922: one sub-block (sub-block 920) contains a subset of flash-optimal popular columns and configurable number of rows, and the other sub-block (sub-block 922) contains remaining columns in the database table 401 and same number of rows as the other sub-block.

Figure 10:
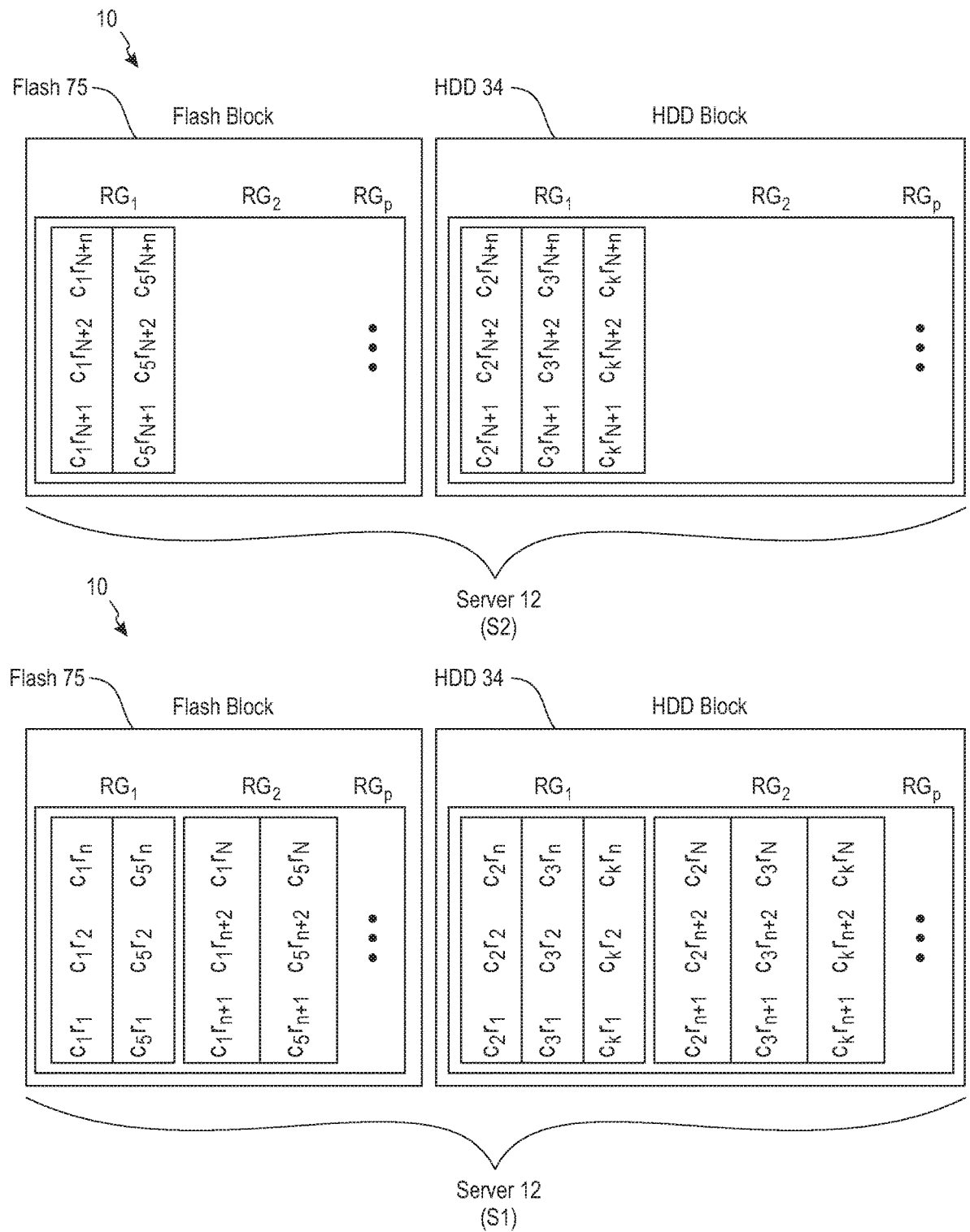
FIG. 10 illustrates placement of sub-blocks from the table of FIG. 6 on flash and HDD, according to one embodiment.

FIG. 10 illustrates placement of sub-blocks on the servers (S1 and S2) 12 into the SDD or flash block of flash 75 and the HDD block of HDD 34 from the table of FIG. 6 stored as lineitem file 601, according to one embodiment. In one embodiment, the FlashQueryFile serializer uses an API of block level processing 410 (FIG. 4) exposed by the underlying file system of a server/system 12 that provides for the FlashQueryFile Serializer to pass two sub-blocks (e.g., sub-blocks 920 and 922, FIG. 9) and their storage tier advisory to the file system. In addition, the API of block level processing 410 provides a colocation advisory to the file system for the two sub-blocks—the colocation advisory advises the file system to place the two sub-blocks on the same server 12; albeit, in different tiers of memory blocks (flash tier 930/flash block and HDD tier 940/HDD block).

In one embodiment, the file system receives a call Write (sub-block1, tier=flash, sub-block2, tier=HDD, collocate=true). The file system then locates a server 12 that has enough space for sub-block1 (e.g., sub-block 920) on the flash tier 930/flash block and sub-block2 (e.g., sub-block 922) on the HDD tier 940/HDD block. Once a server 12 is located, the file system places sub-block1 on the flash tier 930/flash block and sub-block2 on the HDD tier 940/HDD block.

The popular columns in OLAP database (read-only, and data is only appended to tables) are determined based on the algorithm defined above. The algorithm considers several factors such as size, cardinality, data distribution, etc. before determining columns that will optimize the performance by being placed in the SSD (based on whether column will be accessed sequentially or more randomly). In addition to the OLAP kind of use case over petabytes of data, there are several other motivating use cases for performing block-level tiering both in GPFS and GPFS-FPO environment, according to an embodiment. Block co-location may or may not be needed across all use cases. The following example provides a use case where block co-location may be important: in the Hadoop environment, in common DB file formats such as RCFile, the table is represented as a single file and is split across data nodes. Each file system block contains a fixed number of rows. In one or more embodiments, the block is split into one block which will contain SSD-friendly popular columns and another block which will contain remaining columns. In one embodiment, co-location of these two split-blocks on the same data node is important for multiple reasons. In case a query involves both types of columns, the access to the columns on the HDD layer should not incur an additional network latency (which will happen if the block is placed on another node). Both of the blocks can be processed by the same map task as they are co-resident on the data node. This would be important for performance. If the rows whose shards are currently placed on the SSDs are no longer important, GPFS may need to perform a migration of the blocks. It would be important to maintain the co-location information between the blocks as the rows may get popular again and an up-tier back to the SSD tier may need to be performed. In one embodiment, the co-location information helps in properly placing the data blocks on the right tiers on the same data node. In one embodiment, the split-blocks need to be moved in conjunction in event of a restripe.

In the Hadoop environment, an OLAP table is stored in multiple file formats, e.g., RCFile (hybrid row/column), ORCFile (optimized row/column), CIF (column), etc. The file is split into blocks which are spread over the cluster.

Each block contains n Row Groups. Query engine uses the algorithm to split an RCFile block into two blocks—one with popular column metadata and data and other with unpopular column metadata. In one embodiment, the query engine interfaces with the underlying file system while creating and loading an RCFile by: providing a hint to place a popular column block on an SSD pool and the unpopular column block on the HDD pool; and specifying a constraint that popular/unpopular column blocks for a row group be placed on the same data node. In one embodiment, co-location on the same node is very important for performance as data from unpopular columns can be fetched from HDD on same node without incurring network costs. In one or more embodiments, the FS requirements include: support for block-level tiering of a file across storage pools; support for a mechanism for an application to provide advisories and constraints on data placement; and support for maintaining a relationship between popular and unpopular blocks and co-placing them during ingest, restripe, migration, and up tiering.

Conventional systems have a storage level that includes: very little semantic information; only have a view of blocks; coarse-grained decision making; no ingest time decision on upfront, optimal placement of incoming data on the right tier as they are mostly reactive in nature; HSM: outside of file system; rely on stubs (e.g., reparse points, EAs) to capture data movement to another tier; native file system level tiering: file systems support storage pools (HDD, SSD, etc.) and move files across pools based on policies; all existing file systems (e.g., GPFS, EMC's OneF S, StorNext, etc.) perform file system tiering at the entire file level, where different blocks of the same file cannot be placed on different pools. A majority of the existing approaches (e.g., Easy Tier) are performed post-ingest time and are reactive in nature whereby, once the system realizes that some of the data blocks are frequently accessed, such blocks are moved into the SSD tier. As a result, the conventional systems are unable to provide upfront performance guarantees. These systems are also much lower-level in the system stack and lose out the semantic knowledge available to the applications or higher-layers such as the file system. Other systems (e.g., Vertica FlexStore) rely on the user to provide hints on the popular columns, and place such columns on the SSD tier. Such a system has several issues: 1) the user may not even realize all the popular columns and hence, such hints are not comprehensive, 2) f the popularity metrics changes over time, such static schemes cannot capture the changes, and 3) just naively placing all the popular columns in the SSD may not even be feasible because of limited capacity of the SSDs and hence, it is important to optimize the placement of popular columns subject to column size, expected selectivity, and column's presence in the selectivity or the projection clause. Other non-tiering solutions rely on approximate query processing to reduce query latency. The cache samples of the underlying table's tuples are maintained in-memory.

One or more embodiments take advantage of the fact that applications have the most semantic knowledge about their data and can allocate and pack the data blocks with the most suitable data for SSD along with necessary lookup information. In one embodiment, a mechanism is used to pass an advisory to the file system to place incoming file blocks on a specific tier/storage pool; a constraint is specified on the data blocks co-location; the inode structure is modified to support intra-file tiering; a relationship is specified between two blocks using the modified inode structure.

One or more embodiments allow applications to have control on the data blocks placement on the desired tier at the time of file ingest itself, which provides upfront performance guarantees. One or more embodiments allow the file system to: up-tier some blocks if they exhibit higher heat than other blocks, and proactively replicate some blocks either using application's advisory or reactively in response to block heat changes.

In one embodiment, an application provides advisories and constraints for block tiering, and the file system selects a data node that has space for both blocks on their respective tiers. The file system creates entries for the blocks in the inode and denotes the relationship between the blocks in the inode. In one embodiment, the valid intra-file tiering is differentiated from in-transition migration of a file across tiers or a failed migration. One or more embodiments maintain co-location across file migration, restripe, etc. to ensure the application constraints are honored.

Figure 11:
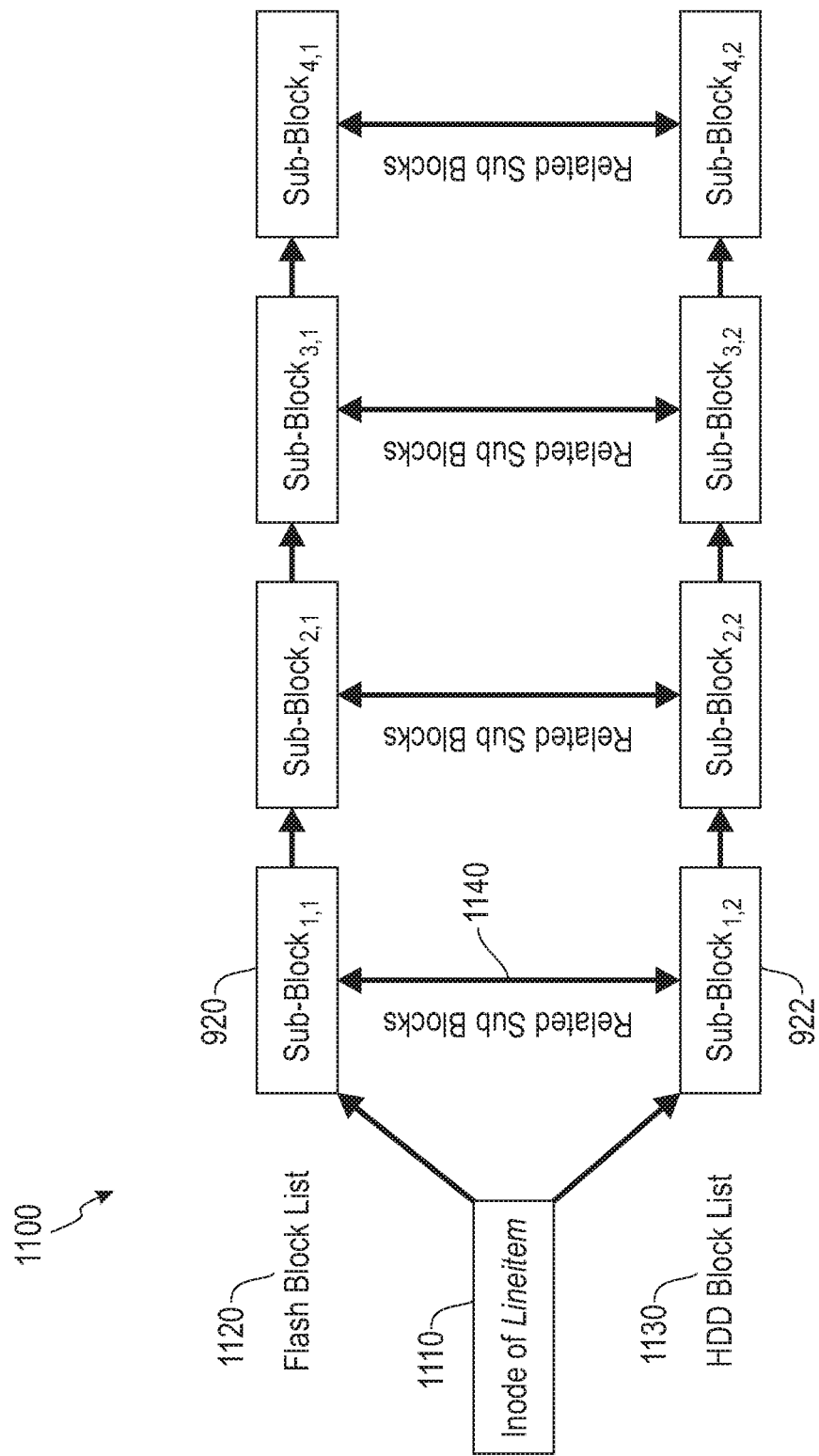
FIG. 11 illustrates an intra-file block tiering and co-location of sub-blocks, according to an embodiment.

FIG. 11 illustrates an intra-file block tiering and co-location example 1100, according to an embodiment. In one embodiment, the inode 1110 of the lineitem file 601 (FIG. 6) has a structure for supporting intra-file-level block tiering and collocated sub-block relationship. In one embodiment, the inode 1110 of the lineitem file 601 is updated by adding the information of sub-block 920 in the SDD or flash block list 1120 of blocks and information of sub-block 922 in the HDD block list 1130 of blocks in the inode 1110. In one embodiment, a relationship 1140 between the two sub-blocks 920 and 922 is recorded to illustrate that the two sub-blocks 920 and 922 contain complementary information. In one embodiment, this relationship is used during migration, restripe, etc., at a later time.

One or more embodiments co-locate file blocks from the same file on the inode 1110 (i.e., intra-file block co-location) using tiering for two sub-blocks on HDD and SDD (i.e., intra-file block tiering) for providing intra-file block organized storage placement. In one example, a first sub-block 920 from a file is tiered as an HDD data sub-block and the second sub-block 922 from the file is tiered as a flash or SDD data sub-block for intra-file block tiering. The popular columns in OLAP database (read-only, and data is only appended to tables) may be determined based on the algorithm described above, which considers several factors such as size, cardinality, data distribution, etc. before determining columns that will optimize the performance by being placed in the SSD or flash tier (based on whether column will be accessed sequentially or more randomly). In one embodiment, the algorithm is modified to determine column sub-block tiering, and the sub-blocks from the same file are co-located for the inode 1110 for providing intra-file block co-location.

In addition to the OLAP type of use case over petabytes of data, there are several other motivating use cases for performing block-level tiering (intra-file block tiering) both in GPFS and GPFS-FPO environment. Sub-block co-location may or may not be needed across use cases. The following example provides a use case where intra-file sub-block co-location may be important. In a Hadoop environment, in common database file formats such as RCFile, the table is represented as a single file and is split across data nodes. Each file system block contains a fixed number of rows. In one embodiment, the block is split/divided into one sub-block which will contain flash/SSD-friendly popular columns and another sub-block which will contain remaining columns. In this example embodiment, intra-file block co-location of these two split-blocks on the same data node is important for multiple reasons: 1) in case a query involves both types of columns, the access to the columns on the HDD layer tier should not incur an additional network latency (which will happen if the block is placed on another node). Both the blocks can be processed by the same map task as they are co-resident on the data node, which is important for performance; 2) if the rows whose shards are currently placed on the SSDs are no longer important, GPFS may need to perform a migration of the blocks. It would be important to maintain the co-location information between the blocks as the rows may get popular again and an up-tier back to the SSD tier would be performed. The co-location information helps in properly placing the blocks on the right tiers on the same data node; 3) the split-blocks need to be moved in conjunction in event of a restripe.

All blocks are not alike in a file and one or more embodiments match the performance of the tier (e.g., SDD or flash and HDD tiers) with the importance of the data stored in the file blocks. A query engine has a lot more semantic information about the relative importance of the various columns in a table and can create blocks in such a way that the popular accessed column information/tuples and indices are coalesced into a file block. Such a block would be a great match for the flash/SSD or similar such faster tier. In order to ensure performance, it is also important to co-allocate the sub-blocks with the remaining columns for the matching row groups in the same node. A majority of tiering solutions such as Easy Tier are much lower-level in the system stack and lose out on the semantic knowledge available to the applications or higher-layers such as the file system. GPFS currently provides tiering across storage pools; however, the tiering is only at the file-level and not at the intra-file bock tiering level as with one or more embodiments.

Figure 12:
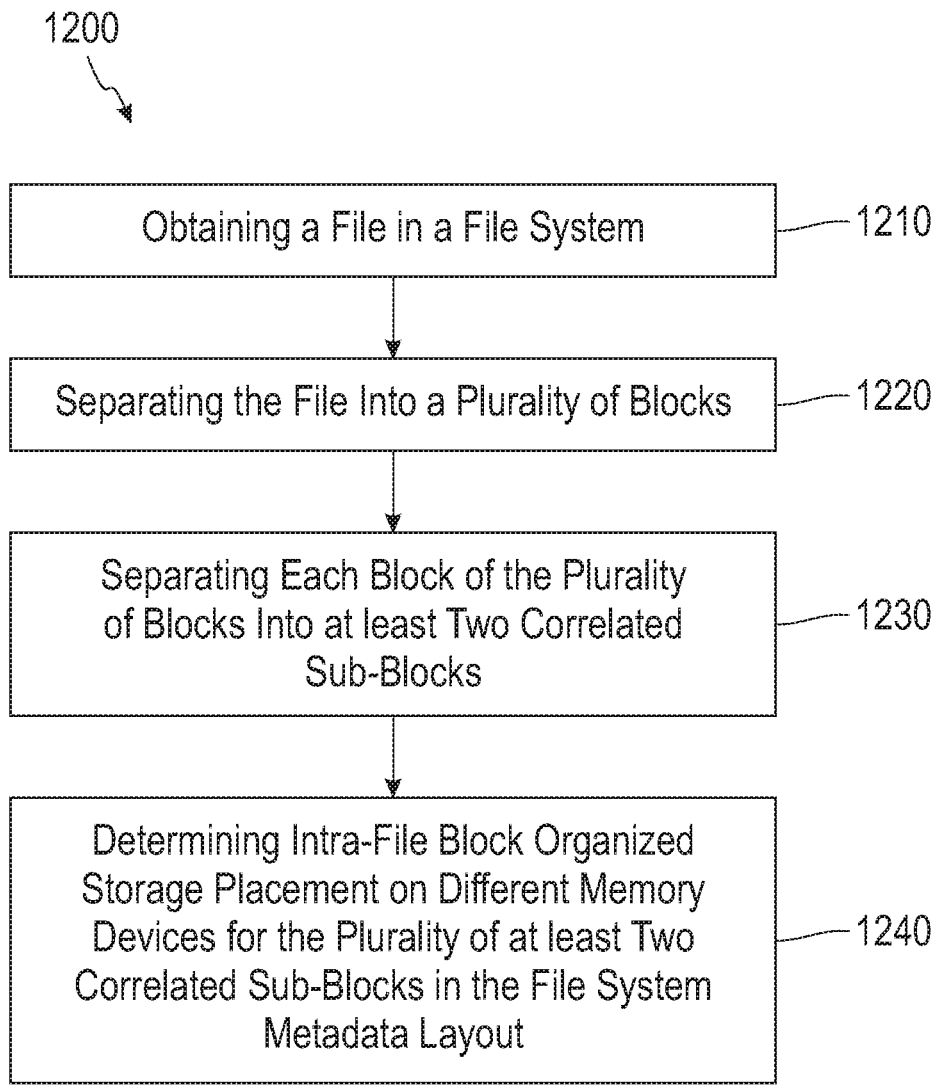
FIG. 12 illustrates a block diagram of a process for intra-file block organized storage placement, according to an embodiment.

FIG. 12 is a block diagram showing a process 1200 for intra-file block organized storage placement in a file system, in accordance with an embodiment. In one embodiment, in block 1210, a file is obtained in a file system. In one embodiment, in block 1220 the file is separated into a plurality (e.g., 2 or more) of blocks. In block 1230, each block of the plurality of blocks are separated into at least two correlated sub-blocks. In block 1240 intra-file block organized storage placement on different memory devices is determined for the at least two correlated sub-blocks in a file system metadata layout. In one embodiment, process 1200 may provide determining intra-file block tiering on the different memory devices for at the least two correlated sub-blocks. In one embodiment, the process 1200 may include determining intra-file block co-location on the different memory devices for the at least two correlated sub-blocks. In another embodiment, process 1200 may provide for determining intra-file block tiering and co-location on the different memory devices for at the least two correlated sub-blocks.

In one embodiment, process 1200 may further determine an application advisory in the file system for determining block storage placement on the different memory devices for the at least two correlated sub-blocks for each of the plurality of blocks. In one embodiment, a modified inode structure supports intra-file block tiering, and includes an entry that includes information indicating a co-location relationship between tiered sub-blocks residing on a same data node server in the file system. In one embodiment, process 1200 may provide for an application controlling block placement on a desired tier at a time of file ingest for providing upfront performance guarantees.

In one embodiment, process 1200 may further include determining a first sub-block of the at least two correlated sub-blocks for the file targeted for a first memory tier, determining a second sub-block of the at least two correlated sub-blocks for the file targeted for a second memory tier, and selecting a data node server that has space for both the first sub-block on the first memory tier and the second sub-block on the second memory tier. In one embodiment, process 1200 may provide for differentiating valid intra-file block tiering from in-transition migration of the file across tiers or a failed migration. In one embodiment, process 1200 may include maintaining a relationship between the at least two correlated sub-blocks, wherein one sub-block contains a subset of popular columns and a second sub-block contains remaining columns, and co-placing the popular blocks and the unpopular blocks during file ingest, memory restriping, file migration, and file block up-tiering.

In one embodiment, process 1200 may further include providing an advisory by an application for placing a sub-block containing a subset of popular columns on a SSD pool and a sub-block containing remaining columns on a HDD pool, and specifying a constraint that the sub-block containing the subset of popular columns and the sub-block containing remaining columns for a specified number of rows, be placed on different storage pools on a same data node server in the file system.

As will be appreciated by one skilled in the art, aspects of the embodiments may be embodied as a system, method or computer program product. Accordingly, aspects of the embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the embodiments may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc. or any suitable combination of the foregoing.

Computer program code for carrying out operations for aspects of the embodiments may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the embodiments are described below with reference to flowchart illustrations and/or block diagrams of methods, apparatus (systems) and computer program products according to the embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

References in the claims to an element in the singular is not intended to mean "one and only" unless explicitly so stated, but rather "one or more." All structural and functional equivalents to the elements of the above-described exemplary embodiment that are currently known or later come to be known to those of ordinary skill in the art are intended to be encompassed by the present claims. No claim element herein is to be construed under the provisions of 35 U.S.C. section 112, sixth paragraph, unless the element is expressly recited using the phrase "means for" or "step for."

The terminology used herein is for the purpose of describing particular embodiments only and is not intended to be limiting of the embodiments. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the embodiments has been presented for purposes of illustration and description, but is not intended to be exhaustive or limited to the embodiments in the form disclosed. Many modifications and variations will be apparent to those of ordinary skill in the art without departing from the scope and spirit of the embodiments. The embodiments were chosen and described in order to best explain the principles of the embodiments and the practical application, and to enable others of ordinary skill in the art to understand the various embodiments with various modifications as are suited to the particular use contemplated.

What is claimed is:

1. A method comprising:
   receiving a workload in a multi-tier enterprise storage system, the workload including a database;
   determining, by a processor, if historical query logs are present for the workload;
   upon a determination that historical query logs are present for the workload:
   analyzing, by the processor, a query log of historical queries for the database;
   creating an inter- and intra-query weighted column relationship graph based on the analyzing; and
   assigning weights to the weighted column relationship graph based on an optimization process that maximizes performance for the historical queries in a training window; and
   upon a determination that historical query logs are not present for the workload:
   creating an inter- and intra-query weighted column relationship graph during run-time by parsing incoming queries.

2. The method of claim 1, wherein each column in a query is connected to other columns in a same query based on its occurrence in a selection clause.

3. The method of claim 1, wherein each column in a query is connected to other columns in a same query based on its occurrence in a projection clause.

4. The method of claim 1, wherein each column in a query is connected to other columns in a same query based on its occurrence in a join clause.

5. The method of claim 1, further comprising:
updating the weighted column relationship graph with new incoming query information.

6. The method of claim 5, further comprising:
for a select clause, evaluating, by the processor, a distribution of a rows evaluated by the historical and run-time queries that have a column in the select clause.

7. The method of claim 5, wherein:
a percentage of rows examined by the select clause being lower than a selectivity threshold indicates that the column can gain performance by being accessed randomly only at desired row positions; and
the percentage of rows examined by the select clause being higher than the selectivity threshold indicates that the column should be accessed sequentially.

8. The method of claim 7, wherein:
columns that can gain performance by being randomly accessed is assigned a higher weight such that the column has a higher chance of having its data blocks being stored in a first storage device.

9. The method of claim 7, wherein columns that are accessed sequentially are assigned a lower weight such that its data blocks have a lower chance of being stored in a second storage device.

10. A computer program product for intra-file block memory management, the computer program product comprising a non-transitory computer readable storage device having program code embodied therewith, the program code executable by a processor to:
receive, by the processor, a workload in a multi-tier enterprise storage system, the workload including a database;
determine, by the processor, if historical query logs present for the workload;
upon a determination that historical query logs are present for the workload:
analyze, by the processor, a query log of historical queries for the database;
create, by the processor, an inter- and intra-query weighted column relationship graph based on the analyzing; and
assign, by the processor, weights to the weighted column relationship graph based on an optimization process that maximizes performance for the historical queries in a training window; and
upon a determination that historical query logs are not present for the workload:
create, by the processor, an inter- and intra-query weighted column relationship graph during run-time by parsing incoming queries.

11. The computer program product of claim 10, wherein each column in a query is connected to other columns in a same query based on its occurrence in a selection clause.

12. The computer program product of claim 10, wherein each column in a query is connected to other columns in a same query based on its occurrence in a projection clause.

13. The computer program product of claim 10, wherein each column in a query is connected to other columns in a same query based on its occurrence in a join clause.

14. The computer program product of claim 10, wherein:
upon a determination that historical query logs are not present for the workload, the program code executable by the processor further to:
update, by the processor, the weighted column relationship graph with new incoming query information.

15. The computer program product of claim 10, wherein:
for a select clause, evaluate, by the processor, a distribution of a rows evaluated by the historical and run-time queries that have a column in the select clause.

16. The computer program product of claim 10, wherein:
a percentage of rows examined by the select clause being lower than a selectivity threshold indicates that the column can gain performance by being accessed randomly only at desired row positions; and
the percentage of rows examined by the select clause being higher than the selectivity threshold indicates that the column should be accessed sequentially.

17. The computer program product of claim 10, wherein:
columns that can gain performance by being randomly accessed is assigned a higher weight such that the column has a higher chance of having its data blocks being stored in a first storage device; and
columns that are accessed sequentially are assigned a lower weight such that its data blocks have a lower chance of being stored in a second storage device.

* * * * *